(12) United States Patent  
Mikhailov et al.

(10) Patent No.: US 10,279,254 B2  
(45) Date of Patent: May 7, 2019

(54) CONTROLLER HAVING VISUALLY TRACKABLE OBJECT FOR INTERFACING WITH A GAMING SYSTEM

(75) Inventors: Anton Mikhailov, Campbell, CA (US); Richard Marks, Pleasanton, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 1913 days.

(21) Appl. No.: 12/259,181

(22) Filed: Oct. 27, 2008

(65) Prior Publication Data

US 2010/0105475 A1 Apr. 29, 2010
US 2012/0289334 A9 Nov. 15, 2012

Related U.S. Application Data

(63) Continuation-in-part of application No. 11/588,779, filed on Oct. 26, 2006, now Pat. No. 8,062,126.  
(Continued)

(51) Int. Cl.
*A63F 13/24* (2014.01)
*A63F 13/42* (2014.01)
(Continued)

(52) U.S. Cl.
CPC .............. *A63F 13/42* (2014.09); *A63F 13/06* (2013.01); *A63F 13/10* (2013.01); *A63F 13/213* (2014.09);
(Continued)

(58) Field of Classification Search
CPC ................ A63F 9/24; A63F 2009/2401; A63F 2009/2402
(Continued)

(56) References Cited

U.S. PATENT DOCUMENTS 3,943,277 A 3/1976 Everly et al. .................. 348/19
4,263,504 A 4/1981 Thomas ........................ 235/454
(Continued)

FOREIGN PATENT DOCUMENTS

CN 2549527 Y 5/2003
EP 0353200 1/1990 ............. G01S 17/10
(Continued)

OTHER PUBLICATIONS

"The Tracking Cube: A Three-Dimentional Input Device", IBM Technical Disclosure Bulletin, Aug. 1, 1989, pp. 91-95, No. 3B, IBM Corp.New York, U.S.
(Continued)

*Primary Examiner* — Jason Skaarup
(74) *Attorney, Agent, or Firm* — Penilla IP, APC

(57) ABSTRACT

Methods, systems and computer programs for determining the location in a field of play of a game controller are provided. A ball section is attached to the game controller to locate the controller using visual information. The method obtains an image of the field of play where the game controller is present, and then finds pixels in the image associated with the ball section. The method further establishes an area encompassing the found pixels and determines a geometric shape based on the area associated with the ball. The location of the controller is calculated based on the geometric shape, with the center of the geometric shape indicating the horizontal and vertical location of the controller, and the size of the geometric shape determining the depth of the controller within the field of play. The location is stored in memory, which is used to drive an action by the computer.

38 Claims, 29 Drawing Sheets

Related U.S. Application Data

(60) Provisional application No. 60/730,659, filed on Oct. 26, 2005.

(51) Int. Cl.
*A63F 13/213* (2014.01)
*A63F 13/20* (2014.01)
*A63F 13/40* (2014.01)
*G06F 3/01* (2006.01)
*G06F 3/03* (2006.01)
*G06F 3/0346* (2013.01)

(52) U.S. Cl.
CPC ............ *A63F 13/24* (2014.09); *G06F 3/017* (2013.01); *G06F 3/0304* (2013.01); *G06F 3/0346* (2013.01); *A63F 2300/1043* (2013.01); *A63F 2300/1093* (2013.01); *A63F 2300/6045* (2013.01)

(58) Field of Classification Search
USPC ............ 463/30–33, 36–39; 345/169; 341/20; 700/91–93
See application file for complete search history.

(56) References Cited

U.S. PATENT DOCUMENTS

| | | | |
|---|---|---|---|
| 4,313,227 A | 1/1982 | Eder | 398/106 |
| 4,558,864 A | 12/1985 | Medwedeff | 273/148 B |
| 4,565,999 A | 1/1986 | King et al. | 345/158 |
| 4,787,051 A | 11/1988 | Olson | 364/518 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 4,959,810 A * | 9/1990 | Darbee et al. | 398/112 |
| 4,963,858 A | 10/1990 | Chien | 340/710 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,128,671 A | 7/1992 | Thomas, Jr. | 341/20 |
| 5,144,594 A | 9/1992 | Gilchrist | 367/129 |
| 5,260,556 A | 11/1993 | Lake et al. | 235/494 |
| 5,297,061 A | 3/1994 | Dementhon et al. | 345/180 |
| 5,317,140 A | 5/1994 | Dunthorn | |
| 5,335,011 A | 8/1994 | Addeo et al. | 348/15 |
| 5,394,168 A | 2/1995 | Smith, III et al. | 345/156 |
| 5,414,426 A * | 5/1995 | O'Donnell et al. | 341/176 |
| 5,426,450 A | 6/1995 | Drumm | 345/168 |
| 5,453,758 A | 9/1995 | Sato | 345/158 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,517,333 A | 5/1996 | Tamura et al. | 358/158 |
| 5,528,265 A | 6/1996 | Harrison | 345/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,505 A | 3/1999 | Toyama et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | 382/154 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netzer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,014,167 A | 1/2000 | Suito et al. | 348/169 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,078,789 A | 6/2000 | Bodenmann et al. | 455/66 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/113 |
| 6,157,368 A | 12/2000 | Faeger | 345/156 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,074 B1 | 6/2001 | Fishkin et al. | 345/156 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,358,145 B1 * | 3/2002 | Wong et al. | 463/17 |
| 6,371,849 B1 | 4/2002 | Togami | 463/4 |
| 6,375,572 B1 | 4/2002 | Masuyama et al. | 463/43 |
| 6,392,644 B1 | 5/2002 | Miyata et al. | 345/419 |
| 6,393,142 B1 | 5/2002 | Swain et al. | 382/154 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |

(56) References Cited

U.S. PATENT DOCUMENTS

| | | |
|---|---|---|
| 6,411,392 B1 | 6/2002 | Bender et al. ............... 358/1.14 |
| 6,411,744 B1 | 6/2002 | Edwards ...................... 382/294 |
| 6,417,836 B1 | 7/2002 | Kumar et al. ................ 345/156 |
| 6,441,825 B1 | 8/2002 | Peters .......................... 345/473 |
| 6,473,516 B1 | 10/2002 | Kawaguchi et al. ......... 382/100 |
| 6,498,860 B1 | 12/2002 | Sasaki et al. ................. 382/103 |
| 6,504,535 B1 | 1/2003 | Edmark ........................ 345/419 |
| 6,513,160 B2 | 1/2003 | Dureau .............................. 725/9 |
| 6,516,466 B1 | 2/2003 | Jackson .......................... 725/62 |
| 6,533,420 B1 | 3/2003 | Eichenlaub ...................... 353/7 |
| 6,542,927 B2 | 4/2003 | Rhoads ........................ 709/217 |
| 6,545,706 B1 | 4/2003 | Edwards et al. ............. 348/169 |
| 6,546,153 B1 | 4/2003 | Hoydal ........................ 382/285 |
| 6,556,704 B1 | 4/2003 | Chen ............................ 382/154 |
| 6,577,748 B2 | 6/2003 | Chang .......................... 382/100 |
| 6,580,414 B1 | 6/2003 | Wergen et al. ............... 345/156 |
| 6,580,415 B1 | 6/2003 | Kato et al. ................... 345/156 |
| 6,587,573 B1 | 7/2003 | Stam et al. ................... 382/104 |
| 6,593,956 B1 | 7/2003 | Potts et al. ................ 348/14.09 |
| 6,595,642 B2 | 7/2003 | Wirth ........................... 351/211 |
| 6,621,938 B1 | 9/2003 | Tanaka et al. ............... 382/276 |
| 6,628,265 B2 | 9/2003 | Hwang ........................ 345/156 |
| 6,661,914 B2 | 12/2003 | Dufour ........................ 382/154 |
| 6,674,415 B2 | 1/2004 | Nakamura et al. ............ 345/32 |
| 6,676,522 B2 | 1/2004 | Rowe et al. ................... 463/42 |
| 6,677,967 B2 | 1/2004 | Swano et al. ................ 715/839 |
| 6,677,987 B1 | 1/2004 | Girod .......................... 348/171 |
| 6,709,108 B2 | 3/2004 | Levine et al. ............... 351/211 |
| 6,720,949 B1 | 4/2004 | Pryor et al. .................. 345/158 |
| 6,727,988 B2 | 4/2004 | Kim et al. ................... 356/319 |
| 6,741,741 B2 | 5/2004 | Farrell ......................... 382/199 |
| 6,746,124 B2 | 6/2004 | Fischer et al. ................. 353/43 |
| 6,749,510 B2 | 6/2004 | Giobbi ........................... 463/42 |
| 6,751,338 B1 | 6/2004 | Wallack ....................... 382/106 |
| 6,753,849 B1 | 6/2004 | Curran et al. ............... 345/158 |
| 6,767,282 B2 | 7/2004 | Matsuyama et al. ............. 463/3 |
| 6,769,769 B2 | 8/2004 | Podlleanu et al. ........... 351/221 |
| 6,772,057 B2 | 8/2004 | Breed et al. ................... 701/45 |
| 6,774,939 B1 | 8/2004 | Peng ......................... 348/231.4 |
| 6,785,329 B1 | 8/2004 | Pan et al. ................ 375/240.08 |
| 6,789,967 B1 | 9/2004 | Forester ...................... 400/489 |
| 6,791,531 B1 | 9/2004 | Johnston et al. ............ 345/157 |
| 6,795,068 B1 | 9/2004 | Marks ......................... 345/419 |
| 6,809,776 B1 | 10/2004 | Simpson et al. ............. 348/565 |
| 6,819,318 B1 | 11/2004 | Geng ........................... 345/420 |
| 6,846,238 B2 | 1/2005 | Wells ............................. 463/39 |
| 6,847,311 B2 | 1/2005 | Li .................................. 341/28 |
| 6,863,609 B2 | 3/2005 | Okuda et al. .................. 463/36 |
| 6,881,147 B2 | 4/2005 | Naghi et al. ................... 463/35 |
| 6,884,171 B2 | 4/2005 | Eck et al. ...................... 463/42 |
| 6,890,262 B2 | 5/2005 | Oishi et al. .................... 463/31 |
| 6,917,688 B2 | 7/2005 | Yu et al. ...................... 381/94.7 |
| 6,919,824 B2 | 7/2005 | Lee ................................. 341/20 |
| 6,924,787 B2 | 8/2005 | Kramer et al. .............. 345/156 |
| 6,928,180 B2 | 8/2005 | Stam et al. ................... 382/104 |
| 6,930,725 B1 | 8/2005 | Hayashi ....................... 348/373 |
| 6,931,125 B2 | 8/2005 | Smallwood ............. 379/433.07 |
| 6,931,596 B2 | 8/2005 | Gutta et al. .................. 715/728 |
| 6,943,776 B2 | 9/2005 | Ehrenburg ................... 345/168 |
| 6,945,653 B2 | 9/2005 | Kobori et al. ................. 353/30 |
| 6,947,576 B2 | 9/2005 | Stam et al. ................... 382/104 |
| 6,951,515 B2 | 10/2005 | Ohshima et al. .............. 463/31 |
| 6,952,198 B2 | 10/2005 | Hansen ........................ 345/158 |
| 6,965,362 B1 | 11/2005 | Ishizuka ........................ 345/82 |
| 6,970,183 B1 | 11/2005 | Monroe ....................... 348/143 |
| 6,990,639 B2 | 1/2006 | Wilson ......................... 715/863 |
| 7,006,009 B2 | 2/2006 | Newman .................. 340/854.5 |
| 7,016,411 B2 | 3/2006 | Azuma et al. .......... 375/240.08 |
| 7,023,475 B2 | 4/2006 | Bean et al. .............. 348/207.99 |
| 7,039,199 B2 | 5/2006 | Rui ................................ 381/92 |
| 7,039,253 B2 | 5/2006 | Matsuoka et al. ........... 382/295 |
| 7,042,440 B2 | 5/2006 | Pryor et al. .................. 345/158 |
| 7,043,056 B2 | 5/2006 | Edwards et al. ............. 382/103 |
| 7,054,452 B2 | 5/2006 | Ukita ............................. 381/92 |
| 7,059,962 B2 | 6/2006 | Watashiba ...................... 463/2 |
| 7,061,507 B1 | 6/2006 | Tuomi et al. ................ 345/611 |
| 7,071,914 B1 | 7/2006 | Marks .......................... 345/156 |
| 7,084,887 B1 | 8/2006 | Sato et al. .................... 345/633 |
| 7,090,352 B2 | 8/2006 | Kobor et al. ................... 353/30 |
| 7,098,891 B1 | 8/2006 | Pryor ........................... 345/158 |
| 7,102,615 B2 | 9/2006 | Marks .......................... 345/156 |
| 7,106,366 B2 | 9/2006 | Parker et al. .............. 348/222.1 |
| 7,116,330 B2 | 10/2006 | Marshall et al. ............. 345/474 |
| 7,116,342 B2 | 10/2006 | Dengler et al. .............. 345/630 |
| 7,121,946 B2 | 10/2006 | Paul et al. ...................... 463/36 |
| 7,139,767 B1 | 11/2006 | Taylor et al. ................ 707/102 |
| 7,148,922 B2 | 12/2006 | Shimada ...................... 348/370 |
| 7,158,118 B2 | 1/2007 | Liberty ........................ 345/158 |
| 7,161,634 B2 | 1/2007 | Long ............................ 384/624 |
| 7,164,413 B2 | 1/2007 | Davis et al. .................. 345/163 |
| 7,183,929 B1 | 2/2007 | Antebi et al. .............. 340/573.1 |
| 7,212,308 B2 | 5/2007 | Morgan ...................... 358/1.18 |
| 7,223,173 B2 | 5/2007 | Masuyama et al. ............ 463/36 |
| 7,224,384 B1 | 5/2007 | Iddan et al. .............. 348/207.99 |
| 7,227,526 B2 | 6/2007 | Hildreth et al. ............. 345/156 |
| 7,227,976 B1 | 6/2007 | Jung et al. ................... 382/103 |
| 7,277,526 B2 | 6/2007 | Hildregh et al. ............. 345/156 |
| 7,239,301 B2 | 7/2007 | Liberty et al. .............. 345/158 |
| 7,245,273 B2 | 7/2007 | Eberl et al. .................. 351/211 |
| 7,259,375 B2 | 8/2007 | Tichit et al. ................ 250/341.8 |
| 7,262,760 B2 | 8/2007 | Liberty ........................ 345/158 |
| 7,263,462 B2 | 8/2007 | Funge et al. ................. 702/179 |
| 7,274,305 B1 | 9/2007 | Luttrell .................... 340/870.02 |
| 7,283,679 B2 | 10/2007 | Okada et al. ................. 382/260 |
| 7,296,007 B1 | 11/2007 | Funge et al. ................... 706/47 |
| 7,301,530 B2 | 11/2007 | Lee et al. ..................... 345/158 |
| 7,305,114 B2 | 12/2007 | Wolff et al. .................. 709/200 |
| 7,331,856 B1 | 2/2008 | Nakamura et al. | |
| 7,346,387 B1 | 3/2008 | Wachter et al. ............. 600/476 |
| 7,352,359 B2 | 4/2008 | Zalewski et al. ............ 345/156 |
| 7,364,297 B2 | 4/2008 | Goldfain et al. ............. 351/206 |
| 7,379,559 B2 | 5/2008 | Wallace et al. .............. 382/100 |
| 7,391,409 B2 | 6/2008 | Zalewski et al. ............ 345/156 |
| 7,414,611 B2 | 8/2008 | Liberty ........................ 345/158 |
| 7,436,887 B2 | 10/2008 | Yeredor et al. .............. 375/240 |
| 7,446,650 B2 | 11/2008 | Scholfield et al. ........ 340/425.5 |
| 7,489,298 B2 | 2/2009 | Liberty ........................ 345/158 |
| 7,489,299 B2 | 2/2009 | Liberty et al. .............. 345/163 |
| 7,545,926 B2 | 6/2009 | Mao ......................... 379/406.08 |
| 7,558,698 B2 | 7/2009 | Funge et al. ................. 702/179 |
| 7,613,610 B1 | 11/2009 | Zimmerman et al. ........ 704/235 |
| 7,623,115 B2 | 11/2009 | Marks .......................... 345/156 |
| 7,627,139 B2 | 12/2009 | Marks et al. ................ 382/103 |
| 7,636,645 B1 | 12/2009 | Yen et al. ..................... 702/152 |
| 7,636,697 B1 | 12/2009 | Dobson et al. ................ 706/12 |
| 7,636,701 B2 | 12/2009 | Funge et al. ................... 706/47 |
| 7,697,700 B2 | 4/2010 | Mao ........................... 381/94.3 |
| 7,721,231 B2 | 5/2010 | Wilson ......................... 715/863 |
| 2001/0056477 A1 | 12/2001 | McTernan et al. ........... 709/219 |
| 2002/0010655 A1 | 1/2002 | Kjallstrom ..................... 705/27 |
| 2002/0056114 A1 | 5/2002 | Fillebrown et al. ............ 725/78 |
| 2002/0065121 A1 | 5/2002 | Fukunaga et al. | |
| 2002/0072414 A1 | 6/2002 | Stylinski et al. ............... 463/42 |
| 2002/0075286 A1 | 6/2002 | Yonezawa et al. ........... 345/679 |
| 2002/0083461 A1 | 6/2002 | Hutcheson et al. ............ 725/62 |
| 2002/0085097 A1 | 7/2002 | Colmenarez et al. ........ 348/211 |
| 2002/0094189 A1 | 7/2002 | Navab et al. ..................... 386/4 |
| 2002/0103025 A1 | 8/2002 | Murzanski et al. | |
| 2002/0126899 A1 | 9/2002 | Farrell ......................... 382/199 |
| 2002/0134151 A1 | 9/2002 | Naruoka et al. ................ 73/291 |
| 2003/0014212 A1 | 1/2003 | Ralston et al. ............... 702/150 |
| 2003/0022716 A1 | 1/2003 | Park et al. ...................... 463/36 |
| 2003/0093591 A1 | 5/2003 | Hohl ............................. 710/22 |
| 2003/0100363 A1 | 5/2003 | Ali ............................... 436/30 |
| 2003/0123705 A1 | 7/2003 | Stam et al. ................... 382/104 |
| 2003/0160862 A1 | 8/2003 | Charlier et al. ........... 348/14.08 |
| 2003/0232649 A1 | 12/2003 | Gizis et al. ..................... 463/40 |
| 2004/0001082 A1 | 1/2004 | Said ............................. 345/730 |
| 2004/0017355 A1 | 1/2004 | Shim ............................ 345/157 |
| 2004/0054512 A1 | 3/2004 | Kim et al. ....................... 703/8 |
| 2004/0063480 A1 | 4/2004 | Wang ............................. 463/8 |
| 2004/0063481 A1 | 4/2004 | Wang ............................. 463/8 |
| 2004/0070565 A1 | 4/2004 | Nayar et al. ................. 345/156 |
| 2004/0087366 A1 | 5/2004 | Shum et al. .................... 463/36 |

(56) References Cited

U.S. PATENT DOCUMENTS

| | | |
|---|---|---|
| 2004/0095327 A1 | 5/2004 | Lo .................. 345/169 |
| 2004/0140955 A1 | 7/2004 | Metz ............... 345/166 |
| 2004/0150728 A1 | 8/2004 | Ogino ............. 348/239 |
| 2004/0165384 A1* | 8/2004 | Allen ............... 362/267 |
| 2004/0178576 A1 | 9/2004 | Hillis et al. ..... 273/148 |
| 2004/0207597 A1 | 10/2004 | Marks |
| 2004/0212589 A1 | 10/2004 | Hall et al. ...... 345/156 |
| 2004/0213419 A1 | 10/2004 | Varma et al. .... 381/92 |
| 2004/0227725 A1 | 11/2004 | Calarco et al. ... 345/156 |
| 2004/0254017 A1 | 12/2004 | Cheng .............. 463/35 |
| 2004/0256630 A1* | 12/2004 | Cao .................. 257/98 |
| 2005/0009605 A1 | 1/2005 | Rosenberg et al. |
| 2005/0037844 A1 | 2/2005 | Shum et al. ...... 463/36 |
| 2005/0047611 A1 | 3/2005 | Mao .................. 381/94.7 |
| 2005/0088369 A1 | 4/2005 | Yoshioka ......... 345/60 |
| 2005/0102374 A1 | 5/2005 | Moragne et al. .. 709/217 |
| 2005/0105777 A1 | 5/2005 | Koslowski et al. .. 382/115 |
| 2005/0117045 A1 | 6/2005 | Abdellatif et al. .. 384/335 |
| 2005/0130743 A1 | 6/2005 | Leifer |
| 2005/0198095 A1 | 9/2005 | Du et al. .......... 709/200 |
| 2005/0226431 A1 | 10/2005 | Mao .................. 381/61 |
| 2005/0239548 A1 | 10/2005 | Ueshima et al. ... 463/36 |
| 2005/0245316 A1* | 11/2005 | Tanaka et al. .... 463/37 |
| 2006/0033713 A1 | 2/2006 | Pryor ............... 345/158 |
| 2006/0035710 A1 | 2/2006 | Festejo et al. ... 463/36 |
| 2006/0038819 A1 | 2/2006 | Festejo et al. ... 345/530 |
| 2006/0084504 A1 | 4/2006 | Chan et al. |
| 2006/0204012 A1 | 9/2006 | Marks et al. ..... 381/26 |
| 2006/0233389 A1 | 10/2006 | Mao et al. ........ 381/92 |
| 2006/0250681 A1 | 11/2006 | Zalewski et al. ... 345/156 |
| 2006/0252541 A1 | 11/2006 | Zalewski et al. ... 463/36 |
| 2006/0256081 A1* | 11/2006 | Zalewski et al. ... 345/156 |
| 2006/0264258 A1 | 11/2006 | Zalewski et al. ... 463/36 |
| 2006/0264259 A1 | 11/2006 | Zalewski et al. ... 463/36 |
| 2006/0264260 A1 | 11/2006 | Zalewski et al. ... 463/36 |
| 2006/0269072 A1 | 11/2006 | Mao ................ 381/56 |
| 2006/0269073 A1 | 11/2006 | Mao ................ 381/56 |
| 2006/0274032 A1 | 12/2006 | Mao et al. ........ 345/156 |
| 2006/0274911 A1 | 12/2006 | Mao et al. ........ 381/334 |
| 2006/0277571 A1 | 12/2006 | Marks et al. ..... 725/37 |
| 2006/0280312 A1 | 12/2006 | Mao ................ 381/56 |
| 2006/0282873 A1 | 12/2006 | Zalewski et al. ... 725/133 |
| 2006/0287084 A1 | 12/2006 | Mao et al. ........ 463/37 |
| 2006/0287085 A1 | 12/2006 | Mao et al. ........ 463/37 |
| 2006/0287086 A1 | 12/2006 | Zalewski et al. ... 436/36 |
| 2006/0287087 A1 | 12/2006 | Zalewski et al. ... 463/37 |
| 2007/0015558 A1* | 1/2007 | Zalewski et al. ... 463/1 |
| 2007/0015559 A1 | 1/2007 | Zalewski et al. ... 463/1 |
| 2007/0021208 A1 | 1/2007 | Mao et al. ........ 463/36 |
| 2007/0025562 A1 | 2/2007 | Zalewski et al. ... 381/92 |
| 2007/0060336 A1 | 3/2007 | Marks et al. ..... 463/30 |
| 2007/0061413 A1 | 3/2007 | Larsen et al. .... 709/217 |
| 2007/0066394 A1 | 3/2007 | Ikeda et al. ...... 463/37 |
| 2007/0072675 A1 | 3/2007 | Hammano et al. .. 463/42 |
| 2007/0111796 A1 | 5/2007 | Giaimo, III et al .. 463/42 |
| 2007/0117625 A1 | 5/2007 | Marks et al. |
| 2007/0120834 A1 | 5/2007 | Boillot ............. 354/103 |
| 2007/0120996 A1 | 5/2007 | Boillot ............. 384/345 |
| 2007/0218994 A1* | 9/2007 | Goto et al. ....... 463/36 |
| 2007/0260340 A1 | 11/2007 | Mao ................ 700/94 |
| 2007/0260517 A1 | 11/2007 | Zalewski et al. ... 705/14 |
| 2007/0261077 A1 | 11/2007 | Zalewski et al. ... 725/35 |
| 2008/0056561 A1 | 3/2008 | Sawachi ......... 382/154 |
| 2008/0070684 A1 | 3/2008 | Haigh-Hutchinson .. 463/32 |
| 2008/0091421 A1 | 4/2008 | Gustavsson ..... 704/233 |
| 2008/0111789 A1 | 5/2008 | Young et al. |
| 2008/0261693 A1* | 10/2008 | Zalewski ......... 463/31 |
| 2008/0274804 A1* | 11/2008 | Harrison et al. .. 463/29 |
| 2009/0010494 A1 | 1/2009 | Bechtel et al. ... 382/104 |
| 2009/0016642 A1 | 1/2009 | Hart ................ 382/278 |
| 2009/0122146 A1* | 5/2009 | Zalewski et al. ... 348/169 |
| 2009/0209343 A1 | 8/2009 | Foxlin et al. |
| 2009/0221368 A1 | 9/2009 | Yen et al. ........ 463/32 |
| 2009/0221374 A1 | 9/2009 | Yen et al. ........ 463/42 |
| 2009/0288064 A1 | 11/2009 | Yen et al. ........ 717/106 |
| 2010/0004896 A1 | 1/2010 | Yen et al. ........ 702/153 |
| 2010/0137064 A1 | 6/2010 | Shum et al. ...... 463/36 |
| 2011/0294579 A1* | 12/2011 | Marks et al. ..... 463/36 |

FOREIGN PATENT DOCUMENTS

| | | | |
|---|---|---|---|
| EP | 0652686 | 5/1995 | ........ H04R 1/40 |
| EP | 0750202 | 12/1996 | ........ G01S 17/00 |
| EP | 0835676 | 4/1998 | ........ A63F 9/22 |
| EP | 1098686 | 5/2003 | ........ A63F 13/04 |
| EP | 1435258 | 7/2004 | ........ A63F 13/04 |
| EP | 2 135 651 A1 | 12/2009 | ........ A63F 13/02 |
| FR | 2814965 | 4/2002 | ........ A63H 30/00 |
| GB | 2206716 | 11/1989 | ........ G06K 7/12 |
| GB | 2376397 | 11/2002 | ........ G06F 3/00 |
| GB | 2388418 | 11/2003 | ........ G06F 3/033 |
| JP | 1284897 | 11/1989 | ........ G10H 1/34 |
| JP | 6102980 | 4/1994 | ........ G06F 3/02 |
| JP | 9128141 | 5/1997 | ........ G06F 3/033 |
| JP | 9185456 | 7/1997 | ........ G06F 3/033 |
| JP | 9-265346 | 10/1997 | ........ G06F 3/03 |
| JP | 1138949 | 2/1999 | ........ G09G 5/00 |
| JP | 2000-172431 | 6/2000 | ........ G06F 3/033 |
| JP | 2000172431 | 6/2000 | ........ G06F 3/033 |
| JP | 2000259856 | 9/2000 | ........ G06T 17/00 |
| JP | 2000350859 | 12/2000 | ........ A63F 13/00 |
| JP | 2001-166676 | 6/2001 | ........ G09B 9/00 |
| JP | 2001166676 | 6/2001 | ........ G09B 9/00 |
| JP | 2002369969 | 12/2002 | ........ A63F 13/12 |
| JP | 2004-145448 | 5/2004 | ........ G06T 17/40 |
| JP | 2004145448 | 5/2004 | ........ G06T 17/40 |
| JP | 2005046422 | 2/2005 | ........ A63F 13/06 |
| TW | 200525410 A | 8/2005 | |
| WO | WO 88/05942 | 8/1988 | ........ G06F 3/033 |
| WO | WO 98/48571 | 10/1998 | ........ H04N 5/45 |
| WO | WO 99/35633 | 7/1999 | |
| WO | WO 99/26198 | 10/1999 | |
| WO | WO 02/27456 | 2/2002 | ........ G06F 3/00 |
| WO | WO 3/079179 | 9/2003 | ........ G06F 3/033 |
| WO | WO 05/073838 | 8/2005 | ........ G06F 3/033 |
| WO | WO 2005107911 | 11/2005 | ........ A63F 13/06 |
| WO | WO 2008/056180 | 5/2008 | ........ G01B 11/02 |

OTHER PUBLICATIONS

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (and Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, (Sep. 20, 1999), pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

(56) References Cited

OTHER PUBLICATIONS

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface—Using Marker Tracking from a Single View",Sep. 9, 1991, Systems and Computers in Japan.

Bolt, R.A., "Put-that-there": voice and gesture at the graphics interface,Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS&T, pp. 564-574 (031).

Ephraim et al. "Speech Enhancement Using a Minimum Mean-Square Error Log—Spectral Amplitude Estimator", 1985, IEEE.

Ephraim et al. "Speech Enhancement Using a Minimum Mean-Square Error Short—Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Lanier, Jaron, "Virtually there: three-dimensional tele-immersion may eventually bring the world to your desk", Scientific American, ISSN: 0036-8733, Year: 2001.

Taiwan Intellectual Property Office, "Taiwan IPO Search Report (with English translation)" for Taiwan Invention Patent Application No. 098129110, completed Jan. 2, 2013.

Chinese Office Action, App. No. 2010800647079, PVD83056A, Oct. 24, 2014.

Lakshminarayanan_"Practical device association protocols for wireless enabled personal devices", pp. 2484-2489, Inst. for Infocomm Research, Singapore, IEEE Comm. Soc. WCNC Feb. 2005.

\* cited by examiner

Ring moving away from the camera

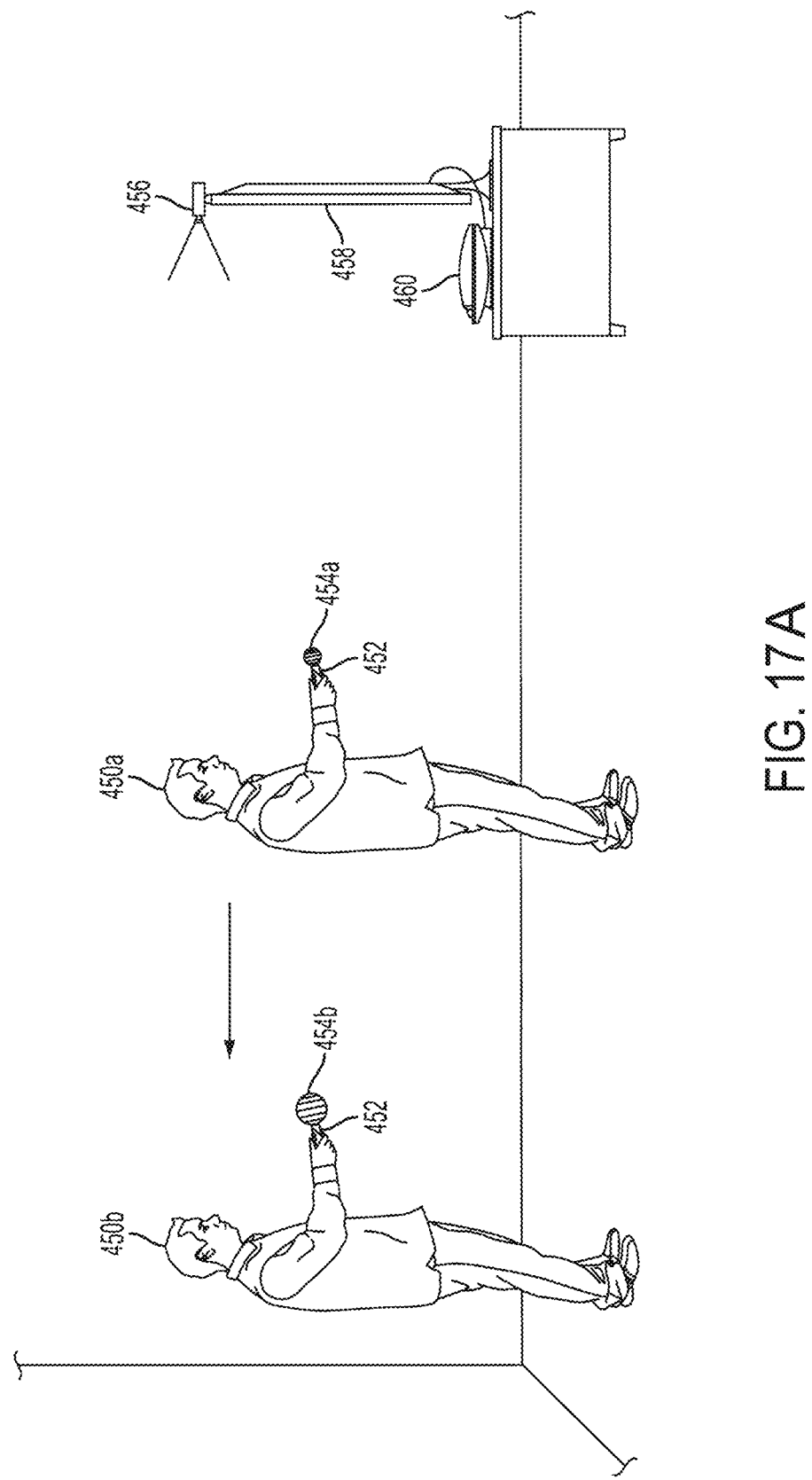

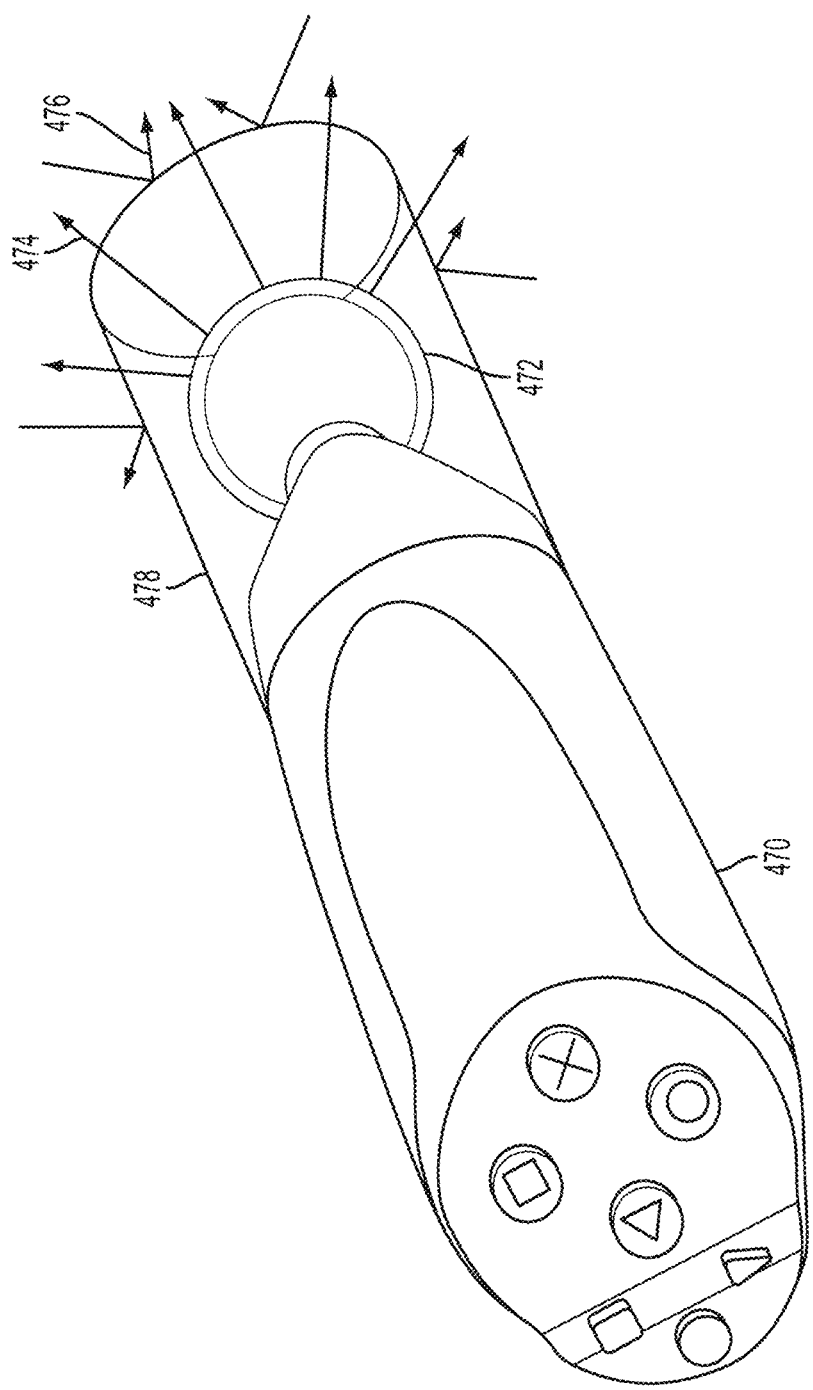

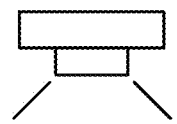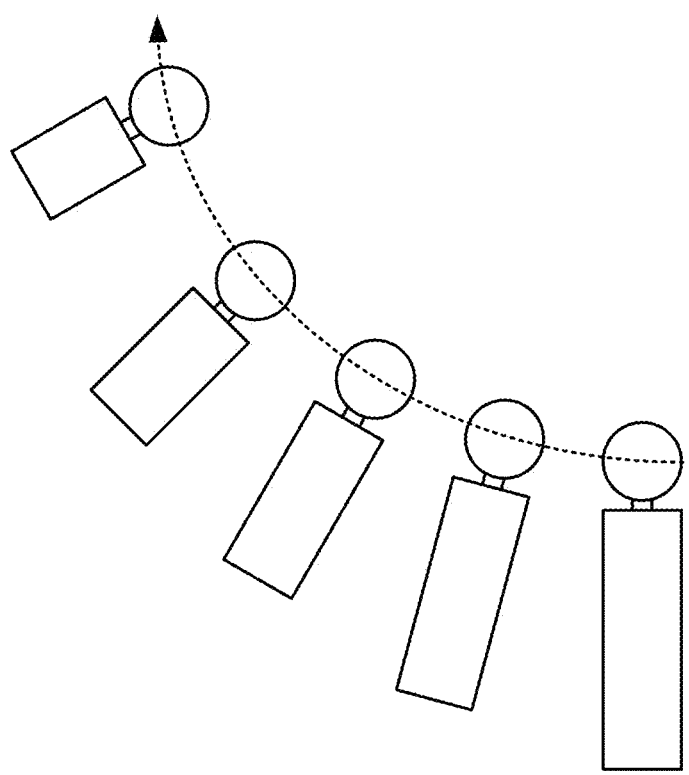
Fig. 19B

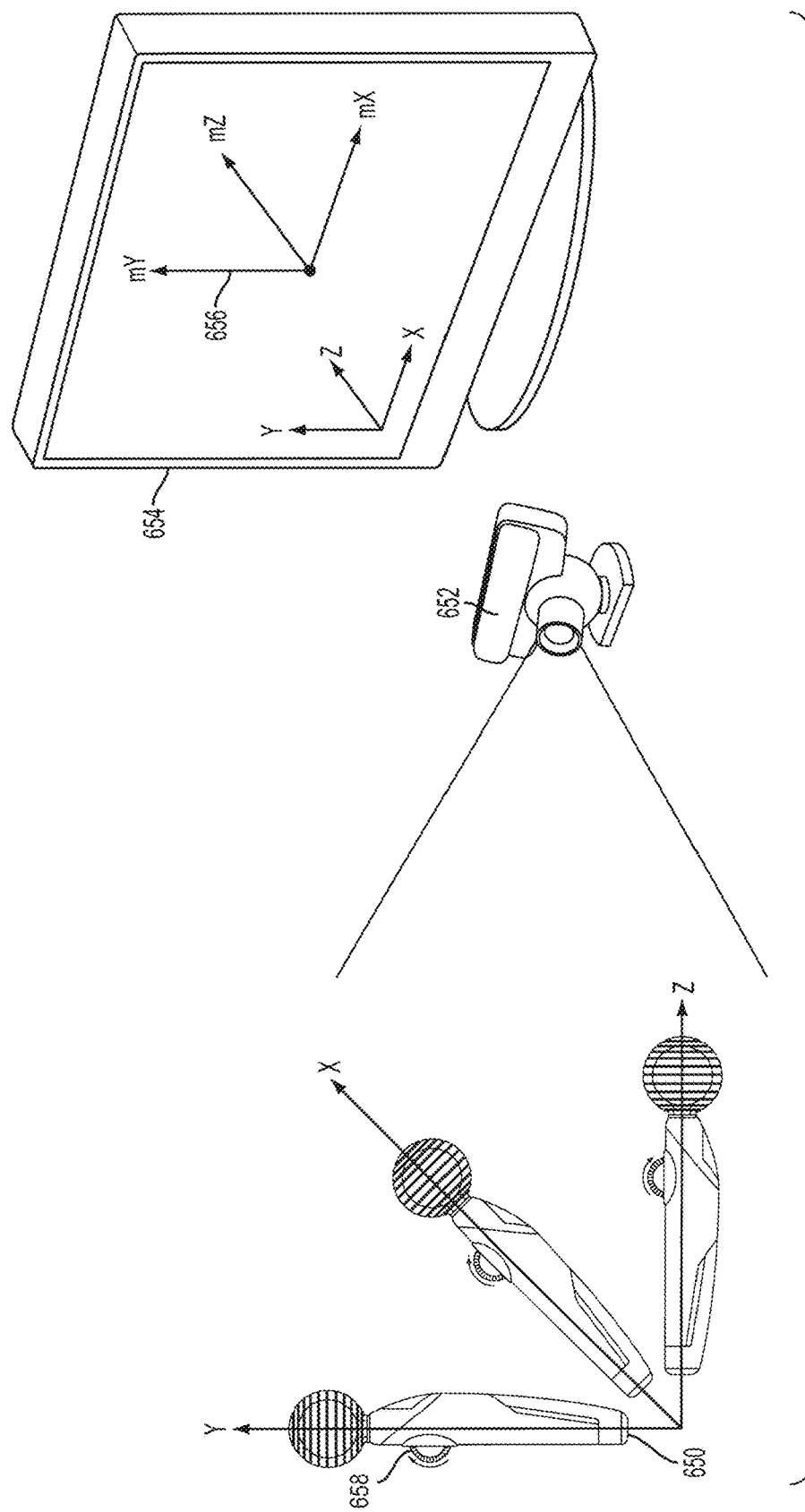

CONTROLLER HAVING VISUALLY TRACKABLE OBJECT FOR INTERFACING WITH A GAMING SYSTEM

CLAIM OF PRIORITY

This application claims priority under 35 USC § 120 as a continuation-in-part of U.S. Pat. No. 8,062,126, with application Ser. No. 11/588,779, filed on Oct. 26, 2006, entitled "System and Method for Interfacing with a Computer Program," which claims priority to U.S. Provisional Patent Application No. 60/730,659, filed Oct. 26, 2005, entitled "System and Method for Interfacing with a Computer Program.

CROSS REFERENCE TO RELATED APPLICATIONS

This application is related to U.S. patent application Ser. No. 12/145,455, filed Jun. 24, 2008, and entitled "DETERMINATION OF CONTROLLER THREE-DIMENSIONAL LOCATION USING IMAGE ANALYSIS AND ULTRASONIC COMMUNICATION", which is incorporated herein by reference.

BACKGROUND

1. Field of the Invention

The present invention relates generally to tracking the location of a game controller in a field of play, and more specifically to tracking the location and the movement of a game controller, which includes a ball attachment, using visual information.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity and computer programs. A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

However, current object tracking suffers in capture accuracy. This problem arises because conventional image analysis can only produce somewhat reliable measurements of the location of the user in two dimensions, as slight variations in the perceived shape of the controller makes determining the horizontal and vertical position of the controller unreliable and very susceptible to noise. In addition, determining the distance between the camera and the object being tracked is difficult, as the slight changes in shape due to movement towards or away from the camera do not provide enough information to reliably calculate distances between the camera and the controller.

It is within this context that embodiments of the invention arise.

SUMMARY

Embodiments of the present invention provide methods, systems and computer programs for determining the location in a field of play of a game controller. A ball section attached to the game controller aids in locating the controller using visual information.

It should be appreciated that the present invention can be implemented in numerous ways, such as a process, an apparatus, a system, a device or a method on a computer readable medium. Several inventive embodiments of the present invention are described below.

In one embodiment, a computer implements a method to determine a location in a field of play of the game controller. The method obtains an image of the field of play where the game controller is present, and then finds pixels in the image associated with the ball section. The method further establishes an area encompassing the found pixels and determines a geometric shape based on the area associated with the ball. The location of the controller is calculated based on the geometric shape, with the center of the geometric shape indicating the horizontal and vertical location of the controller, and the size of the geometric shape determining the depth of the controller within the field of play. The location is stored in memory, which is used to drive an action by the computer.

In another embodiment, a method is presented to determine the location in a field of play of a game controller. The method obtains an image of the field of play and finds pixels in the image associated with a ring in the ball section connected to the game controller. Further, the method establishes an area that encompasses the pixels found associated with the ring. An ellipse is determined based on the area previously established, and the location of the controller is calculated based on the ellipse, where the center of the ellipse indicates the horizontal and vertical coordinates of the controller, and the size of the ellipse determines the depth of the controller within the field of play. The location is stored in memory, which is used to drive an action by the computer.

In another embodiment, a method is presented to determine a location in a field of play of a game controller using a combination of information sources with respect to the location and movement of the controller. The method obtains an image of the controller and receives status information from the game controller. The status information can be originated in an accelerometer, a gyroscope or a magnetometer. The method determines a geometric shape associated with the ball section connected to the game controller, and calculates the location of the controller by combining the status information with information about the geometric shape.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 17A-B depict embodiments of a ball that can change size or appearance to improve detection.

FIG. 18 shows an embodiment of a game controller with a ball section enclosed in a shell.

FIGS. 19A-B describe a controller with sensors for improving movement tracking, according to one embodiment.

FIGS. 21A-C describe the use of a wheel in a controller to initiate computer actions, according to one embodiment.

DETAILED DESCRIPTION

The following embodiments describe methods, systems and computer programs for determining the location in a field of play of a game controller. A ball section is attached to the game controller to locate the controller using visual information. The method obtains an image of the field of play where the game controller is present, and then finds pixels in the image associated with the ball section. The method further establishes an area encompassing the found pixels and determines a geometric shape based on the area associated with the ball. The location of the controller is calculated based on the geometric shape, with the center of the geometric shape indicating the horizontal and vertical location of the controller, and the size of the geometric shape determining the depth of the controller within the field of play. The location is stored in memory, which is used to drive an action by the computer.

It will be obvious, however, to one skilled in the art, that the present invention may be practiced without some or all of these specific details. In other instances, well known process operations have not been described in detail in order not to unnecessarily obscure the present invention.

Figure 1A:
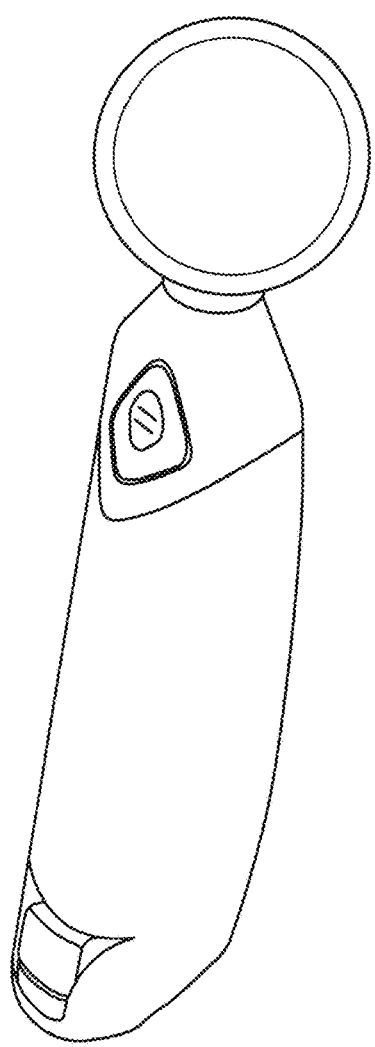
FIGS. 1A-B show embodiments of a game controller with a ball section attached.
Figure 1B:
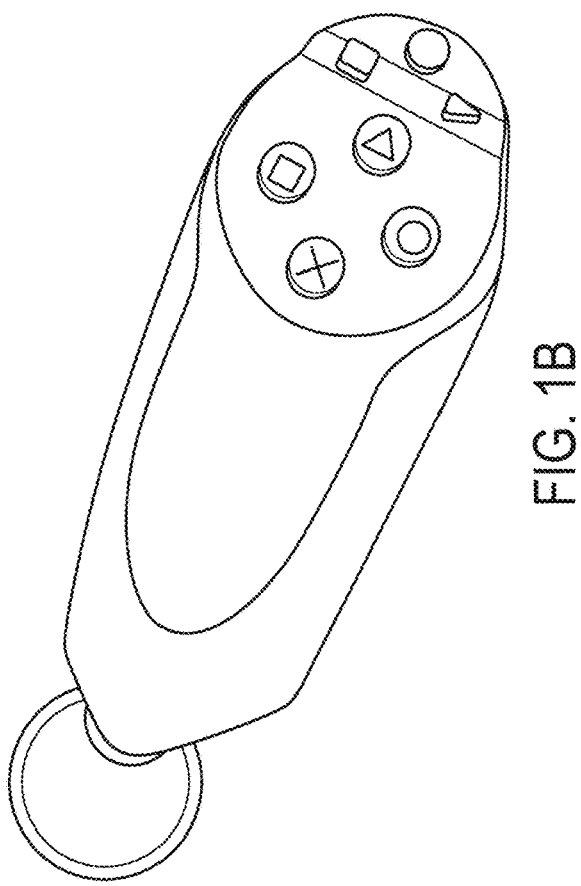

FIGS. 1A-B show embodiments of a game controller with a ball section attached. The ball attached to the controllers can be of different colors, and in one embodiment, the ball can light up. The color in the ball can be driven by RGB (Red Green Blue) Light-Emitting Diodes (LEDs) inside the ball. Additionally, the brightness of the illuminated ball can be controlled in order to track the ball under different camera exposure settings. In one embodiment, the color of the ball is used to differentiate controllers from different users and among controllers held by the same user on different hands.

Although a spherical ball is shown in the controllers of FIGS. 1A and 1B, the ball can have other shapes for visual tracking purposes, such as a partial sphere, an imperfect sphere, an elongated ball (like one used in American football or in rugby), a cube-like shape, etc.

The controllers of FIGS. 1A and 1B are designed for one-hand use, but ball-attached two-hand controllers can also be tracked using embodiments described herein. In one embodiment, the two controllers held by the user on different hands are identical, and in another embodiment the controllers are different. Typically, the controllers will be very similar, being different just in the buttons at each controller. In one embodiment, the controller includes a Universal Serial Bus (USB) connection for charging the controller, Bluetooth for wireless communication with the console, and buttons such as start, select and PS.

In one embodiment, the ball or sphere is 4 cm. in diameter, but other sizes are also possible. Bigger sizes help with visual recognition. A ball with a 5 cm. diameter provides about 55 percent more pixels for image recognition than a 4 cm. ball.

Figure 1C:
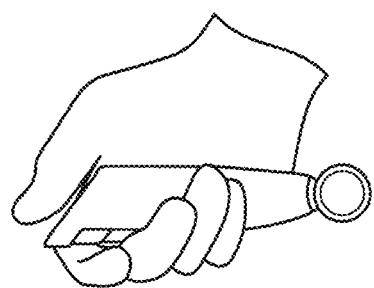
FIGS. 1C-E depict different operational modes for the game controller of FIGS. 1A-B.
Figure 1D:
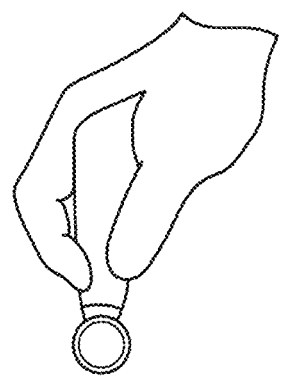
Figure 1E:
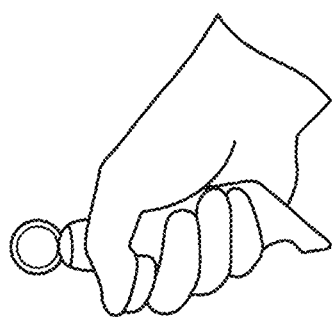

FIGS. 1C-E depict different operational modes for the game controller of FIGS. 1A-B. FIG. 1C shows a "reverse wand" operation, where the ball section is located at the bottom of the controller, and the top includes input buttons. In this configuration, the controller can be used as an arcade flight stick by pivoting on the sphere. In one embodiment, an inertial unit provides the angle of the "stick" (controller) and the twist, and the top surface includes a directional pad. In another embodiment, the top surface holds removable plates to change button configuration, as described below with respect to FIGS. 4A-4D. This mode of operation can be used in firing, driving, flying games, etc.

In one embodiment, the controller includes buttons for the index and middle finger in the reverse wand configuration. As a result, two reverse wand controllers provide the same functionality as a Sony DualShock®2 controller from Sony Computer Entertainment America Inc.

FIG. 1D shows a controller behind held in a "pencil" configuration. The ball faces the camera for visual identification, and buttons in the body of the controller enable user input. This mode can be use in games where the controller is a paint brush, a flashlight, a pointer, a firing weapon, etc. FIG. 1E illustrate the use of a controller in wand mode. In one embodiment, the wand includes two thumb buttons at the top of the handle and a trigger for the index finger, but other configurations are also possible. The wand mode can be used as a magic-wand, a music director's baton, a tennis racket, a hatchet or similar weapon, a tool such as a pick, an umbrella, a rope, etc.

Figure 2B:
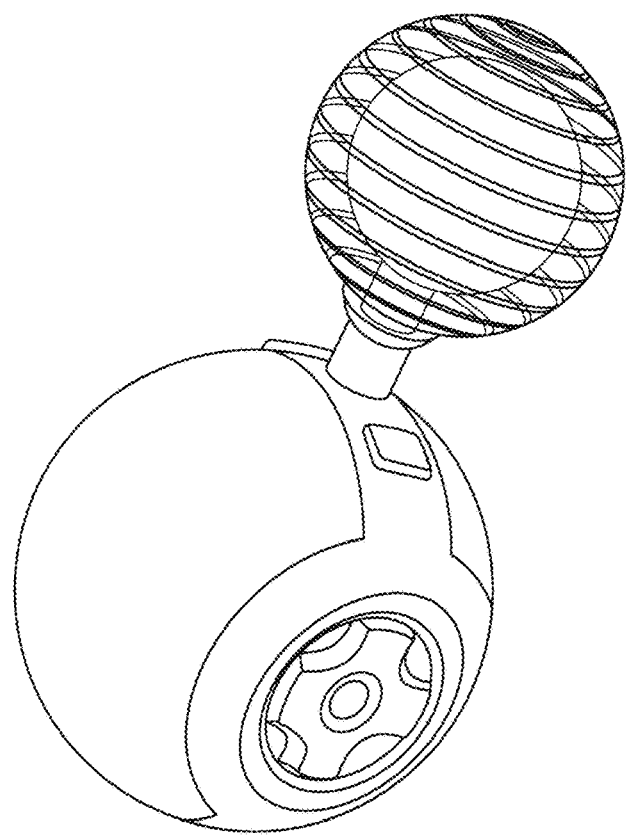
FIGS. 2A-2B shows other embodiments of a game controller with a ball attached.
Figure 2A:
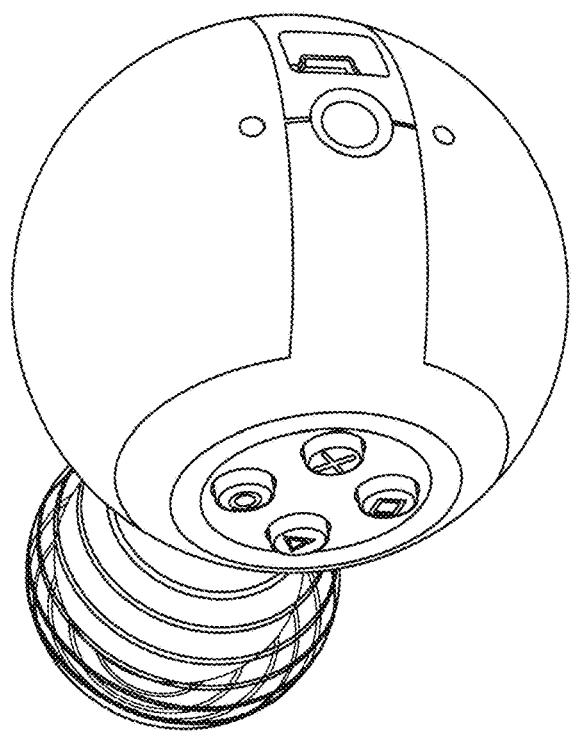

FIGS. 2A-2B shows other embodiments of a game controller with a ball attached. The body of controllers in FIGS. 2A and 2B are spherical like the attached balls. The controllers have different button configurations and are intended for use in different hands. In one embodiment, the controllers are identical, and can be used either with the left or the right hand. The controllers of FIGS. 2A and 2B are held in a "baseball" configuration, that is, the controller is about the size of a baseball or a tennis ball and is held as a baseball in the palm of the hand. Similar to the configurations in FIGS. 1C to 1E, the controllers in 2A and 2B can be held with the ball attachment pointing in different directions, such as towards the camera, the floor, or the ceiling.

Figure 3A:
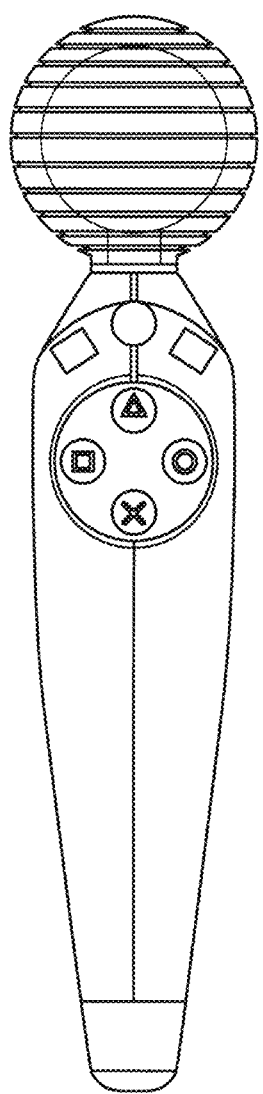
FIGS. 3A-3B depict different embodiments of a ball-attached game controller.
Figure 3B:
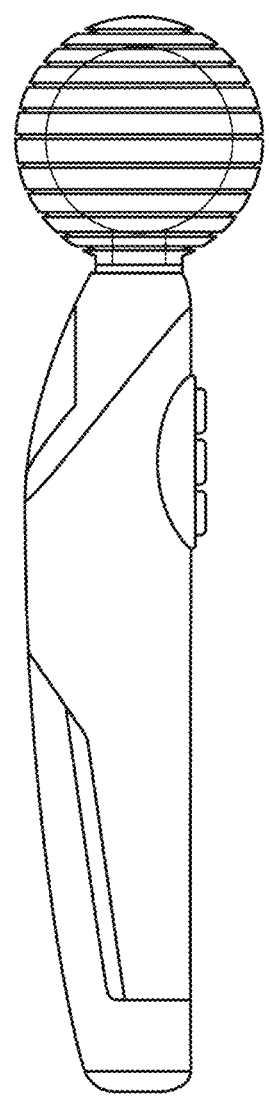

FIGS. 3A-3B depict different embodiments of a ball-attached game controller. The controllers are slimmer and designed for light weight applications.

Figure 4D:
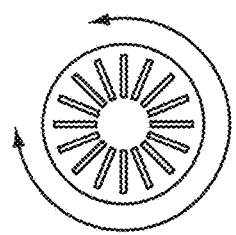
FIGS. 4A-D show an embodiment of a ball-attached game controller with interchangeable face-plates.
Figure 4C:
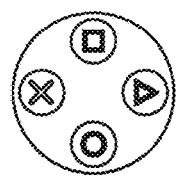
Figure 4B:
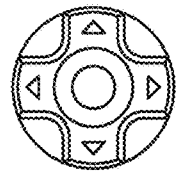
Figure 4A:
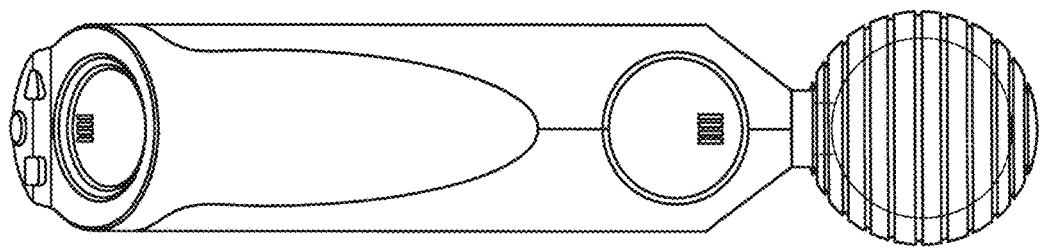

FIGS. 4A-D show an embodiment of a ball-attached game controller with interchangeable face-plates. FIG. 4A shows a controller, similar to the controllers in FIGS. 1A-B, but with interchangeable face-plates. The face-plates for FIGS. 4B-4D can be attached to the controller, either at the top or at the side. In another embodiment, the sizes of the face plates are different for the slots on the top and the side, and the face plates for the top are not exchangeable with the face plates for the side. FIGS. 4B-4D show a D-pad attachment, an action-buttons pad, and a touch pad, respectively. The attachments include electrical connections and a mechanical grip that snaps the attachments securely when placed on the controller.

Figure 5:
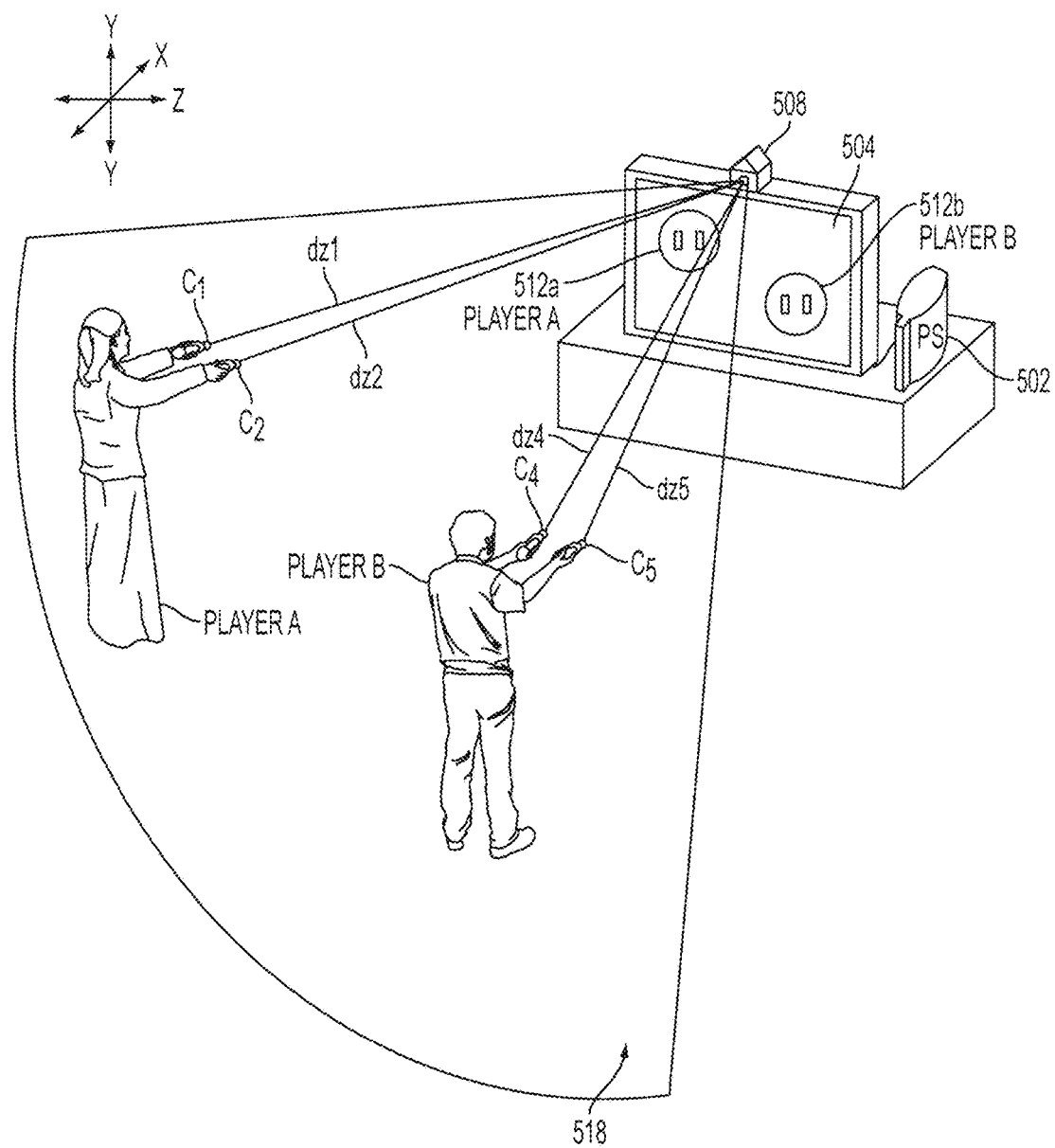
FIG. 5 shows a schematic diagram of a multiplayer environment and the use of visual information to determine the locations of the different controllers held by the players, according to one embodiment.

FIG. 5 shows a schematic diagram of a multiplayer environment and the use of visual information to determine the locations of the different controllers held by the players, according to one embodiment. Image capture device 508 obtains an image of playing field 518 and the image is analyzed to obtain the location of ball-attached controllers $C_1$, $C_2$, $C_4$ and $C_5$. Distances $d_{z1}$, $d_{z2}$, $d_{z4}$, and $d_{z5}$ are estimated by analyzing the shape of the respective balls in the captured image. Computing system 502, uses the obtained coordinates and distances to produce representations of the players in screen 504, avatars 512a and 512b respectively. A typical distance for good image recognition is about 10 ft (3 mtr). One advantage of using visual recognition is that improvements in image capture and image recognition can be included in the system without having to change the controller.

FIGS. 6A-6D illustrate different embodiments for assigning a geometric shape to a perceived shape from a captured image. FIG. 4A shows some of the problems with determining where the "true" geometric shape (i.e. the ball) given a captured image. Since the ball is a sphere, the goal is to determine the circle that corresponds to the ball in the image captured by the camera. There are different ways of assigning a circle to a perceived shape, such as the one in FIG. 6A, depending on the methodology. For example, a circle inside the received shape could be selected in order to assure that all pixels in the circle are pixels corresponding to the ball, or a circle could be selected that would contain all the shape pixels and the minimum amount of non-shape pixels. Alternatively, the algorithm may focus on detecting the outside curves delimiting the captured shape and then fit a circle that approximates those curves.

In many cases, the number of pixels captured associated with the ball is small. In one embodiment, a ball located at 10 ft. (3 mt.) generates an image where the radius of the circle is 4 pixels. In other words, each pixel corresponds to a depth of 2.5 ft. If a pixel is missed because of noise or because of an inaccurate algorithm, then the location of the player jumps 2.5 ft. As a result, pixel counting by itself does not provide an accurate measure of depth. Additionally, if the ball gets occluded due to the movement of the controller, only a partial image may be captured by the camera. Curve fitting becomes critical to analyze the perceived shape and determine the best location and shape of the ball.

Figure 6A:
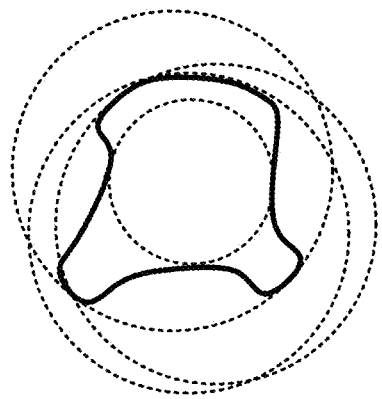
FIGS. 6A-6D illustrate different embodiments for assigning a geometric shape to a perceived shape from a captured image.
Figure 6B:
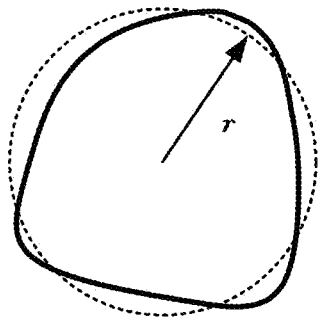

FIG. 6B illustrates estimating the center and the radius r of the circle. The depth, also known herein as z, is related to the area of the ball, and is proportional to 1/r. In one embodiment, the method finds the pixels that correspond to the visual identification of the ball. The pixels associated with the ball are counted to determine the area, and then the center and the r are calculated based on the size.

In another embodiment, the periphery of the shape in FIG. 6B is analyzed to determine the curve surrounding the shape. The curve is analyzed in order to determine the circle that best fits the curve. In one embodiment, the circle chosen is the circle that would have the smallest sum of the unique areas delimited by the circle and the curve surrounding the perceived shape.

Figure 6C:
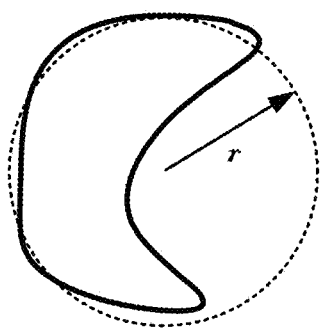

FIG. 6C illustrates the difficulty in finding an associated circle given an imperfect shape. Visually inspecting the shape, it can be inferred that only a partial section of the ball has been captured. Doing a straight pixel count to determine the area would not produce an accurate result. In one embodiment, the method checks for the "fuzzy" boundaries around the edges, which may be caused by shadows, light variations, etc., and determines the shape of the outside curve. The perimeter curve of the shape is analyzed to determine the center, also referred to herein as "centroid", and to determine the radius that best fits the area and the outside curve.

Figure 6D:
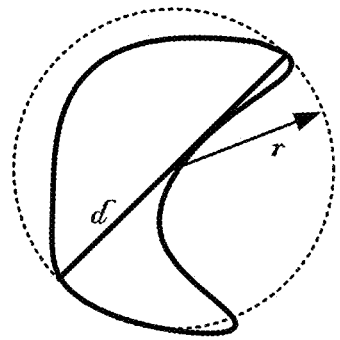

FIG. 6D illustrates the "fit the longest stick" method. As previously described, the image is analyzed and a shape of the captured ball is determined. The method determines the longest straight segment, or "stick," that fits inside the shape. The longest segment is then considered the diameter of the circle associated with the ball.

Figure 7:
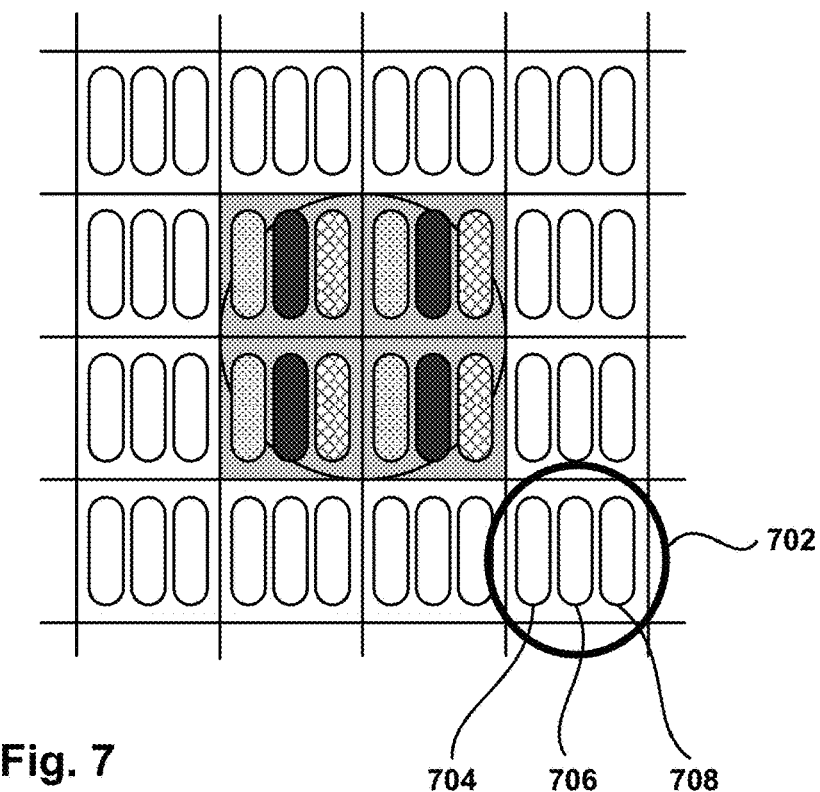
FIG. 7 illustrates how to use subpixel analysis to find pixels corresponding to the ball section in accordance with one embodiment.

FIG. 7 illustrates how to use subpixel analysis to find pixels corresponding to the ball section in accordance with one embodiment. In many display and image-acquisition systems are, the pixel grid is divided into single-color regions that contribute to the displayed or sensed color when viewed at a distance. In some displays, such as LCD, LED, and plasma displays, these single-color regions are separately addressable elements, which have come to be known as subpixels. For example, LCDs typically divide each pixel 702 into three subpixels 704, 706, and 708.

In one embodiment, the pixel analysis focuses on just one color, such as blue. In other embodiments, the analysis focuses on the combination of two subpixels, improving accuracy but requiring more computation. Additionally, the analysis of one pixel is not constrained to analyzing the pixel, or the subpixels in the pixel, and nearby pixels are analyzed to improve accuracy and reduce the effects of noise or other conditions such as inconsistent lighting.

Figure 8:
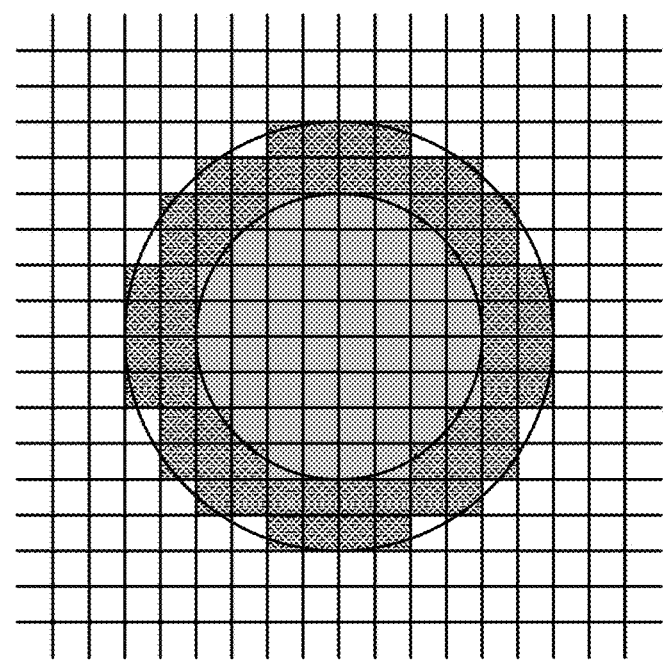
FIG. 8 shows the effects of blurring an image to improve shape detection according to one embodiment of the invention.

FIG. 8 shows the effects of blurring an image to improve shape detection according to one embodiment of the invention. The image is taking with the camera slightly out of focus causing a blurring effect on the ball, which causes the perceived area of the ball to be bigger than an image taken without blurring. A larger area means more pixels for analysis and improved accuracy.

Figure 9:
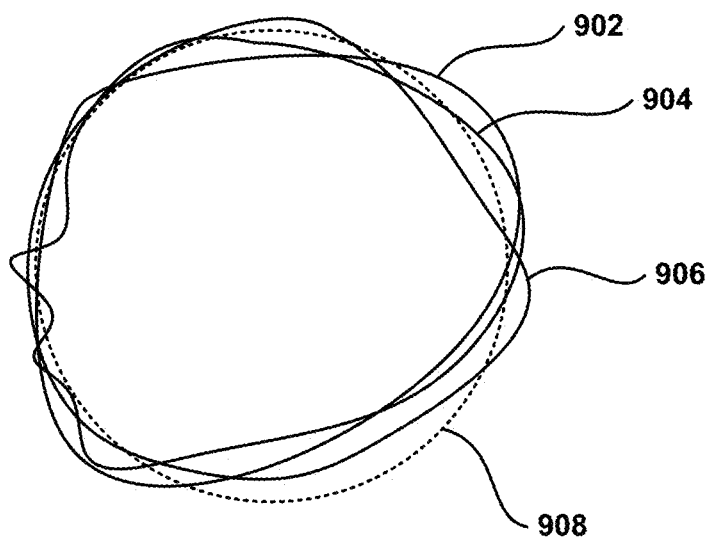
FIG. 9 depicts the use of several consecutive captured images to determine ball location according to one embodiment.

FIG. 9 depicts the use of several consecutive captured images to determine ball location according to one embodiment, referred to herein as smoothing. In one embodiment, the captured images are not analyzed in isolation. The information from one image is compared with previously taken images. If the image-taking frequency is high enough, consecutive images will be similar, even after factoring the movement of the controller. As a result, the information from previous images can be used to detect sudden anomalous pixel variations, which are likely caused by noise, bad lighting, ball occlusion, etc.

In one embodiment, the information from previous images is weighted in inverse proportion to their age, that is, older images are given smaller weights, as the information that they convey becomes less relevant.

Figure 10:
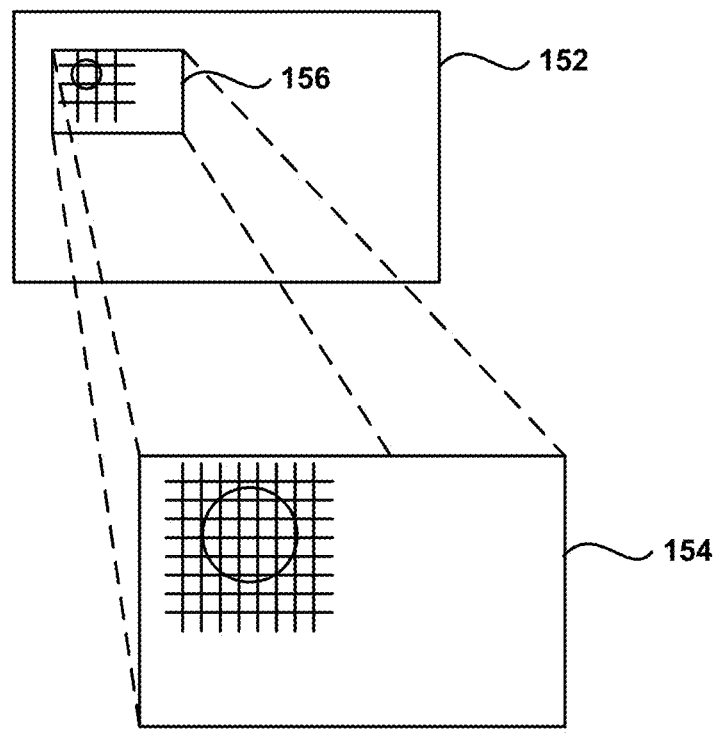
FIG. 10 illustrates one embodiment for taking an image from a reduced area of the playing field to increase accuracy.

FIG. 10 illustrates one embodiment for taking an image from a reduced area 156 of the playing field 152 to increase accuracy. The computer system keeps track of the movement of the ball, together with the controller attached to the ball, and has the expectation that the ball will be in about the same place as the last time an image was taken, assuming the video taking frequency is adequate to allow for small movements of the controller between images. In one embodiment, the video taking camera as zoom capabilities and takes image 154 of reduced area 156 where the ball was in the last image and a buffer area around the ball to allow for movement of the controller. The image of the reduced area has higher resolution and provides more pixels associated with the ball for better location determination.

As a result, the field of play where the ball is present is reduced when taking the image of the reduced area, but this can be easily compensated by tracking the movement of the ball in order to capture zoomed-in images centered around the last known position of the ball.

In another embodiment, the camera is able to zoom-in only in the center of the field of play. In this case, the zoom-in function is only used when the ball is located towards the center of the field of play. This will cause the resolution to be better when the player is located around the center of the field of play and worse when the ball is located in the periphery of the field of play.

Figure 11:
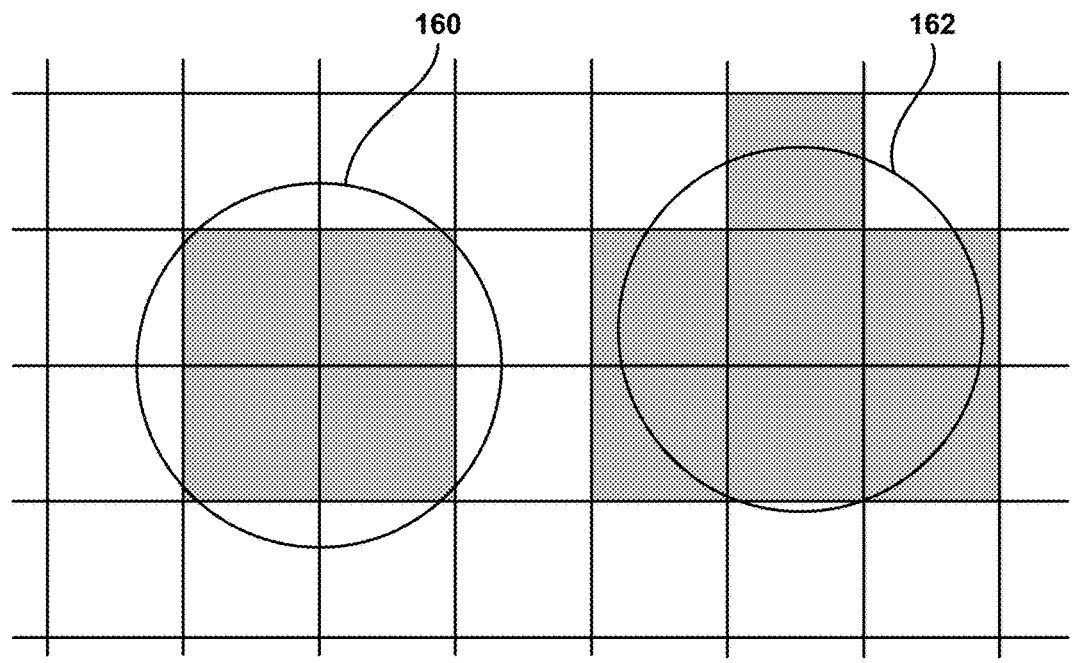
FIG. 11 depicts image recognition of a ball with a small number of pixels, according to one embodiment.

FIG. 11 depicts image recognition of a ball with a small number of pixels, according to one embodiment. As previously described with respect to FIG. 6A, recognition of a ball when few pixels are available can cause big changes in the perceived shape when even one pixel is missed or miscalculated. The problem of few-pixel availability can be aggravated when the ball moves across pixel boundaries. In a first position 160 of the ball, the method perceives the ball as having four pixels. In one embodiment, the method determines that a pixel is associated with the color of the ball when at least fifty percent of the pixel corresponds to the ball, but other embodiments may use other percentages as the threshold. As the ball moves to second position 162, the method perceives 7 pixels associated with the ball. Because the ball corresponds to a few pixels, the position of the ball in the pixel grid is a factor under the scenario in FIG. 11. In addition, the problem can be compounded with other factors such as noise and rasterization.

Figure 12:
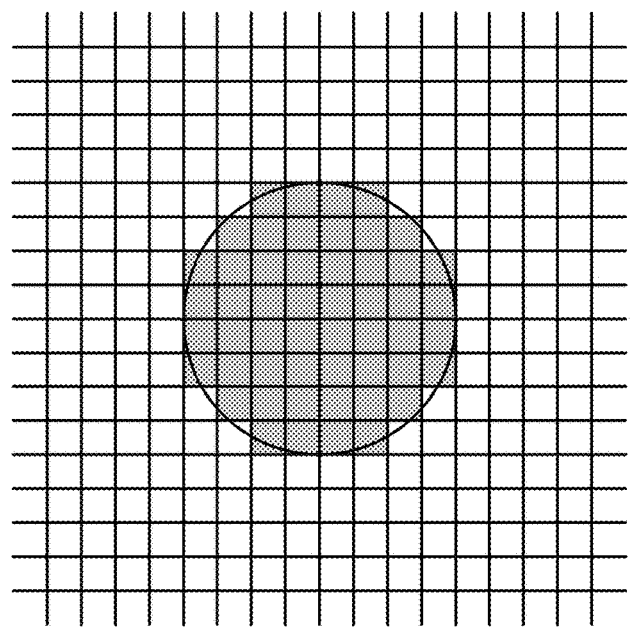
FIG. 12 depicts one embodiment for image recognition using a high resolution camera.

One embodiment solves the small number of pixels problem by using a higher resolution camera. FIG. 12 depicts one embodiment for image recognition using a high resolution camera. Because the ball includes a larger number of pixels, small movements of the ball across the pixel grid will have a smaller impact on shape recognition than when using a lower resolution camera.

Figure 13A:
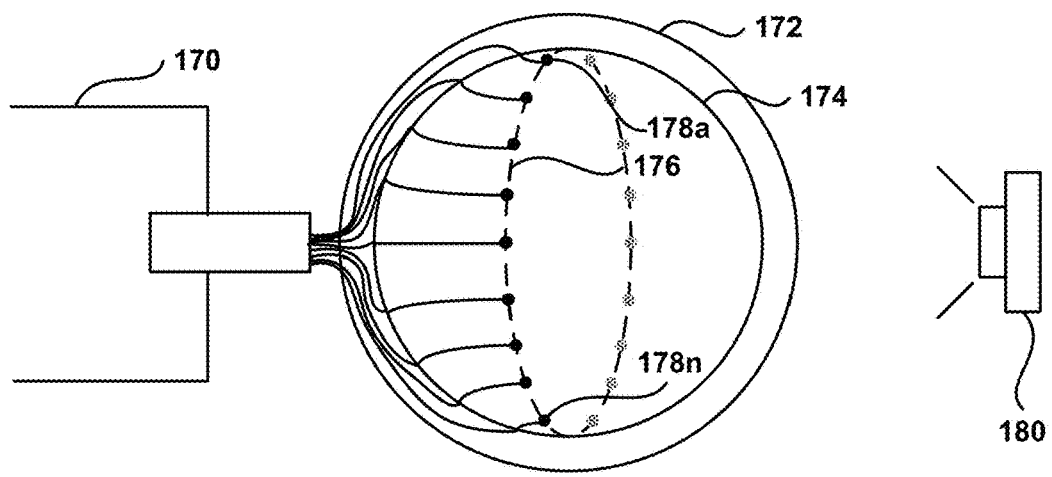
FIGS. 13A-C illustrate ball detection using an illuminated ring movable to face the camera in accordance with one embodiment.
Figure 13B:
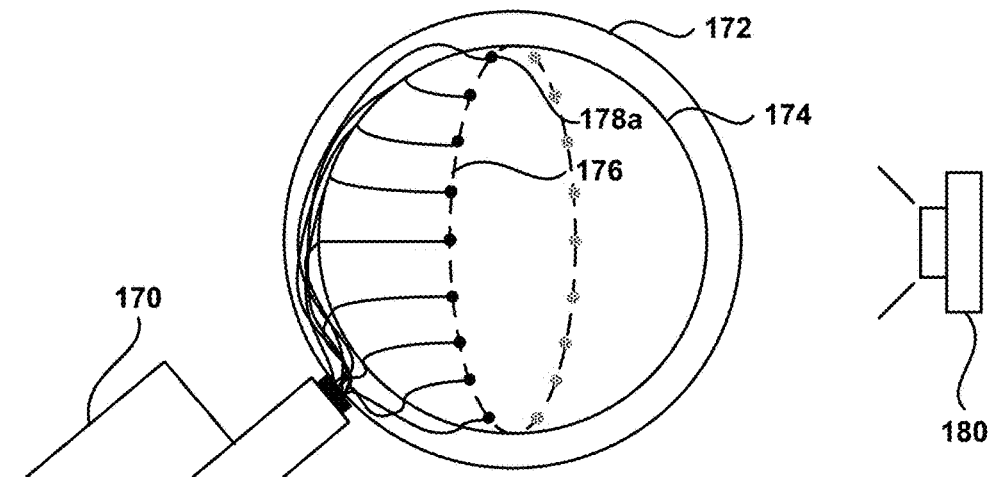
Figure 13C:
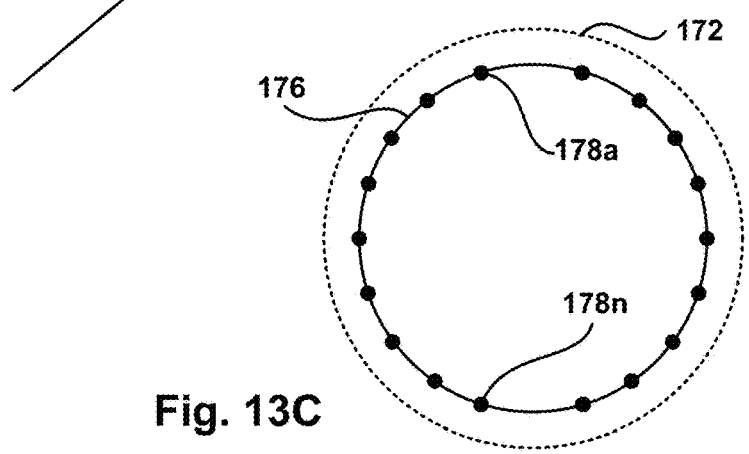

FIGS. 13A-C illustrate ball detection using an illuminated ring movable to face the camera in accordance with one embodiment. Controller 170 has a ball section 172 attached for visual recognition based on images taken with image capture device 180. Ball section 172 includes an inner sphere or ball 174. Ball 174 has a plurality of light sources 178a-n that form a visual ring facing image capture device 180. In one embodiment, the light sources correspond to the ends of optical wires that shine the light received from the corresponding optic wire. In another embodiment, the light sources correspond to LEDs.

Inside ball 174 is configured to move inside ball 172 in order to substantially face capture device 180. In one embodiment, ball 174 is suspended in a liquid to facilitate the movement. FIG. 13B shows the same controller 170 of FIG. 13A after the controller has moved his orientation about 45 degrees. Although controller 170 has moved, inside ball 174 has rotated with respect to controller 170 so the illuminated ring still faces capture device 180. As a result, the image captured will be a ring, which aids in determining the location of the ball, as described below with respect to FIGS. 15A-B.

In another embodiment, the ring can be illuminated with different color lights to enhance image recognition, or to differentiate different controllers in the field of play. In yet another embodiment, more than one ring are available for illumination, where only one ring is illuminated at one time, or where a plurality of rings are illuminated at the same time for image recognition. FIG. 13C illustrates a frontal view of the ball section, as seen by image capture device 180.

Figure 14A:
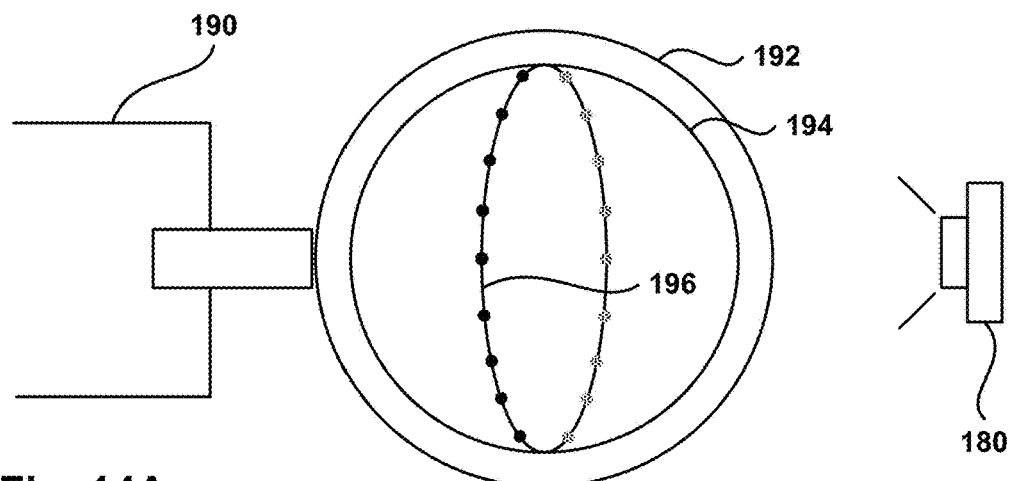
FIGS. 14A-H illustrate detection of a distinguishable ring in the ball section, according to one embodiment.

FIGS. 14A-H illustrate detection of a distinguishable ring in the ball section, according to one embodiment. FIG. 14A includes controller 190 with ball 192 attached, which includes inside ball 194 with illuminated ring 196. Unlike the controllers of FIGS. 13A-C, the controllers in FIGS. 14A-C do not have a ball that moves with respect to the controller. Thus, as the controller moves from the substantially vertical position in FIG. 14A to a different orientation, as in FIG. 14B, ring 196 goes from facing image capture device 180 straight, to facing the image capture device at an angle with respect to the line connecting the ball with capture device 180. In FIG. 14A, the image captures an illuminated circle, and in FIG. 14B, the image captures an elliptical ring. In most controller positions where the ring is not facing the camera straight, the image will only capture about half of the ring because the other half section is hidden in the posterior non-visible side of the ball.

Figure 14B:
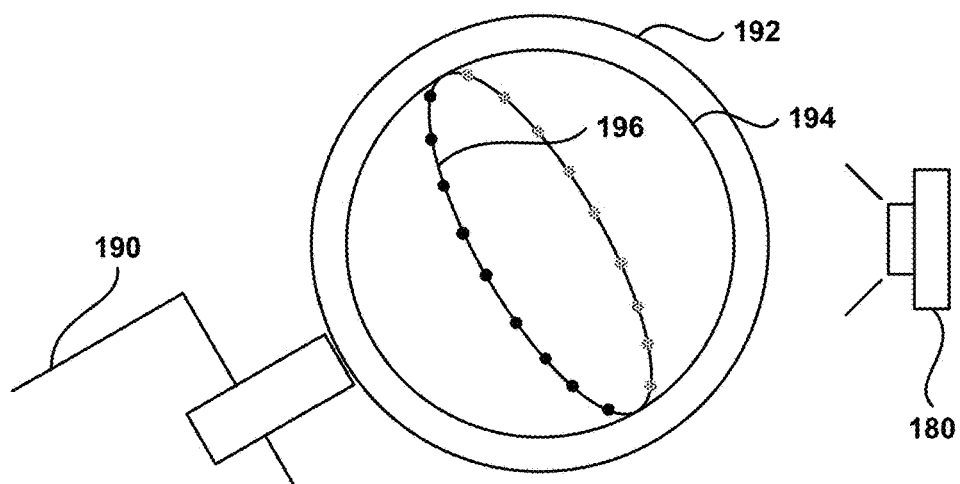
Figure 14C:
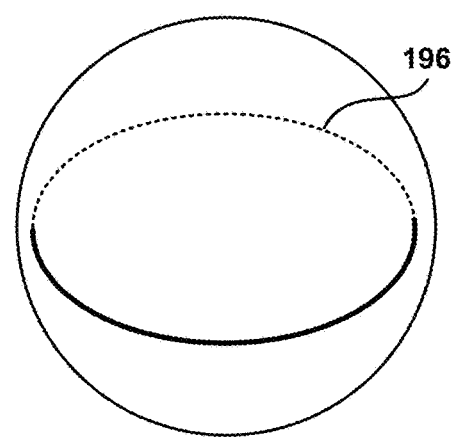
Figure 14D:
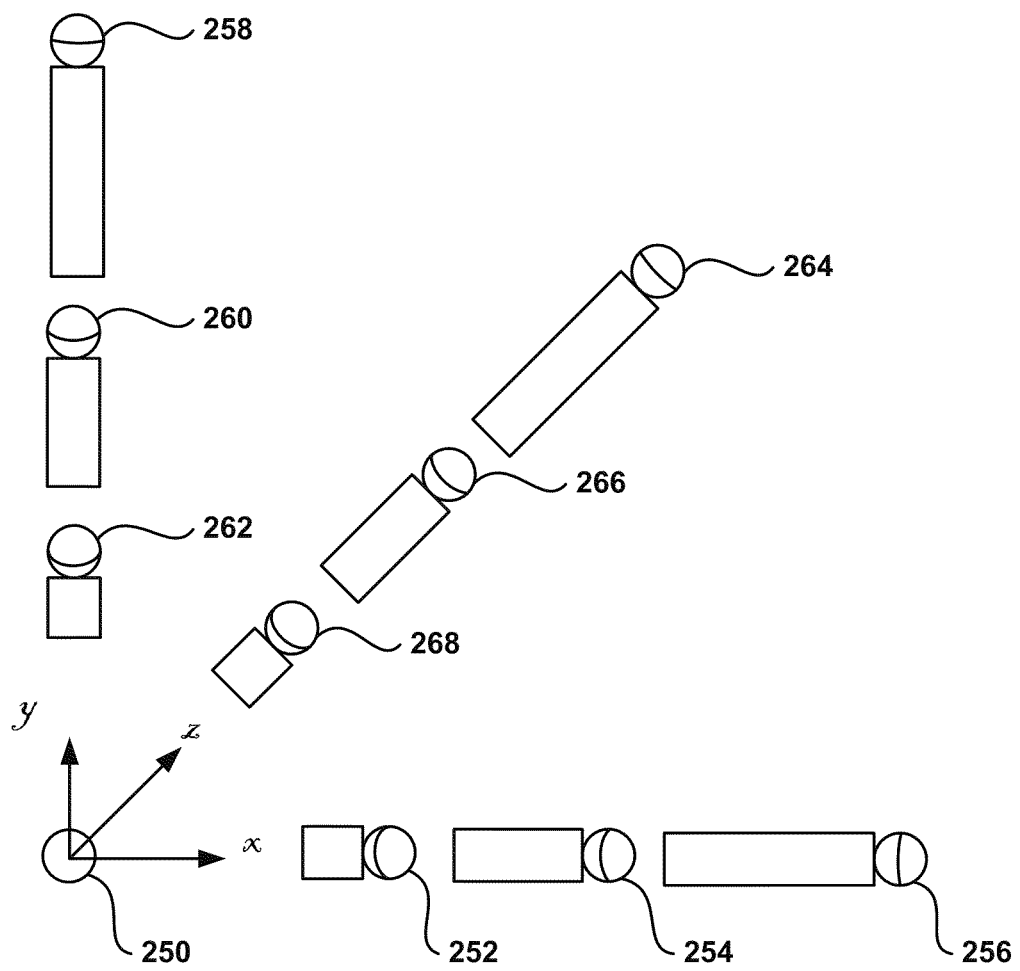

FIG. 14C shows the image captured by the camera when the controller is in the position shown in FIG. 14B. FIG. 14D illustrates the effects of changing the orientation of the controller with respect to the camera, according to different axis x, y, and z. The controller at position 250 is facing the camera, thus the camera only "sees" the ball. The rest of the positions correspond to changing the orientation of the controller within a different axis. This can be visualized by having a player holding the controller aiming directly at the camera in position 250. Then the player changes the position of the controller, just by rotating the elbow in the x, y, or z direction.

As the controller turns in the x direction (horizontally), a bigger part of the controller will be visible (the actual hand of the player is ignored), and the ring will rotate until the controller is oriented horizontally 256, and the ring will be perceived sideways as a line. The similar effect can be observed when the controller rotates in the y direction (vertically). Movement in the z (depth) direction will cause the perceived ring to change also. The effect of the size of the ball becoming smaller as the ball moves away from the camera is ignored in FIG. 14D.

Figure 14E:
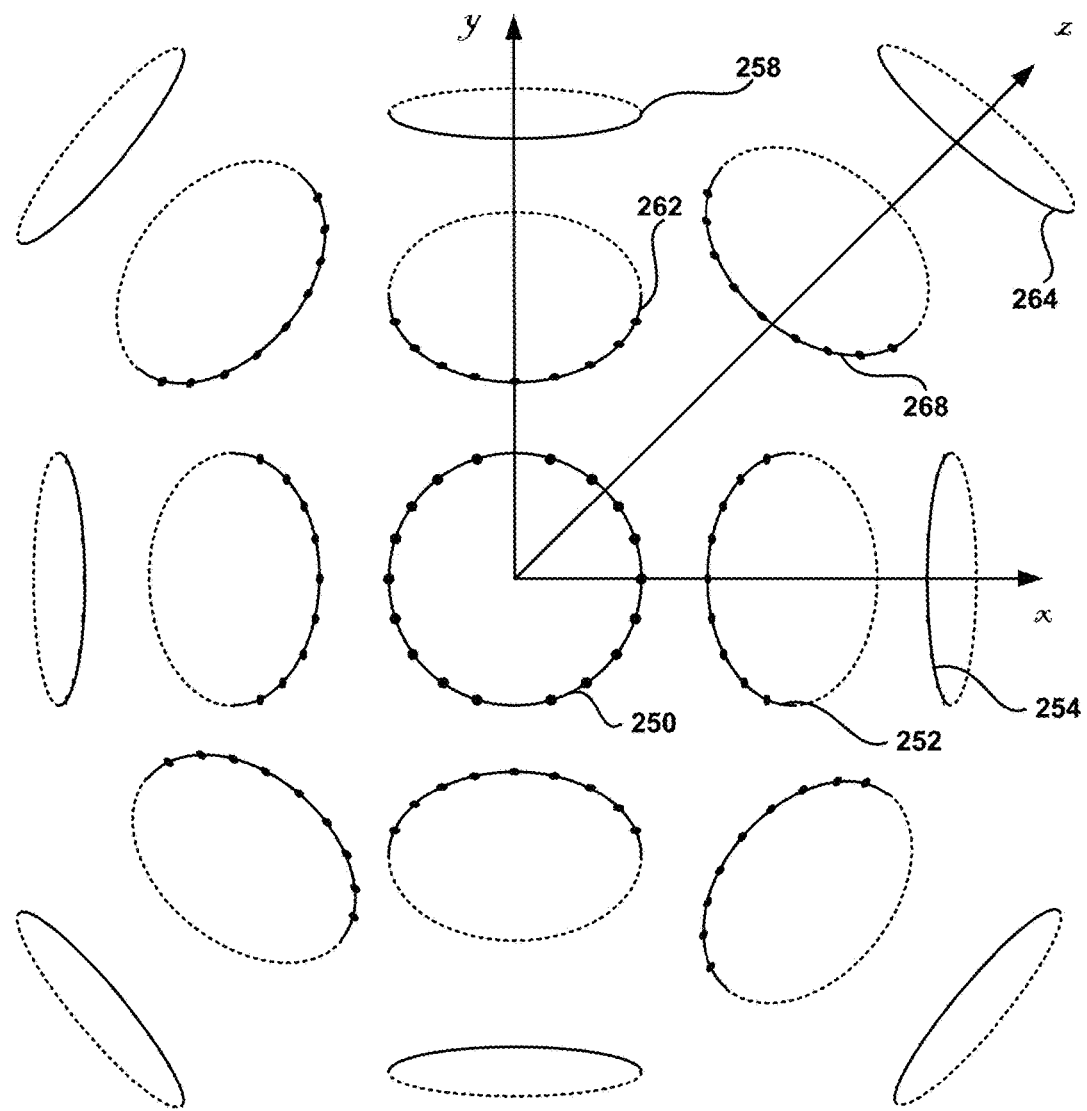

FIG. 14E shows the shape of the ring, as perceived by the camera, according to the movement of the controller as discussed in FIG. 14D. The perfect circle 250 shown when the ball faces the camera gets distorted as the ball moves and becomes an ellipse, where the small axis becomes smaller and smaller as the ring moves further away from the position facing the camera.

It should be noted that an ellipse is a collection of points in a plane such that the sum of the distances to two fixed points is a constant. The two fixed points are called foci. If the two foci coincide, then the ellipse is a circle. In other words, a circle is a special case of an ellipse. The embodiments described herein referring to an ellipse are designed to cover the case where the ellipse is a circle, because the circle is just one form of an ellipse, such as circle 250 of FIG. 14E.

Figure 14F:
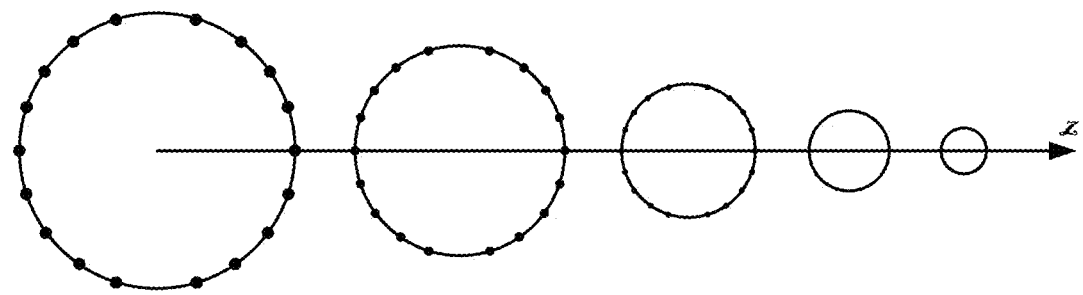

FIG. 14F depicts a controller facing the camera and moving away in the z direction. As expected, the ring becomes smaller as the ball gets further away from the camera.

Figure 14G:
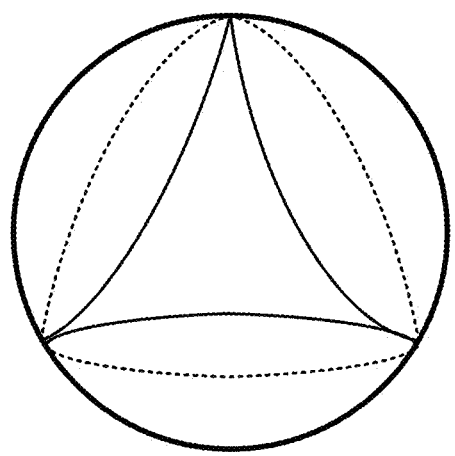
Figure 14H:
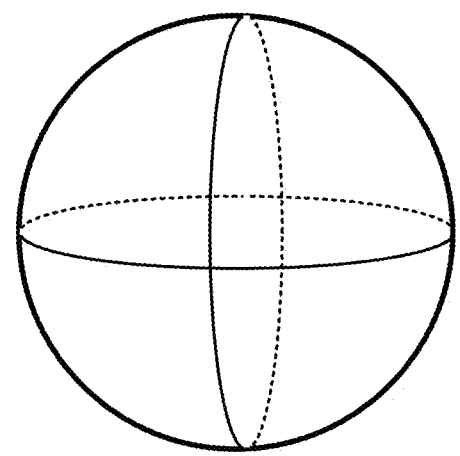

In another embodiment, the ball includes different illuminated patterns, such as the three rings of FIG. 14G. FIG. 14H shows a ball with two rings perpendicular to each other. In yet another embodiment, the ball has an illuminated ring, such as the one in FIG. 14E, however the ring has a different orientation when the controller is aiming straight at the camera. The circle formed by the illuminated ring is perpendicular to the camera, where the camera would perceive a straight line when the controller is oriented straight towards the camera, such as any of the rings shown in FIG. 14H. In yet another embodiment, the ring is not completely illuminated because the part of the ring facing the controller would rarely be captured by the camera, resulting in savings in manufacturing of the ring, as well as in battery consumption. In one embodiment, the ring is only illuminated along a 270 degrees arc of the ring, but other values are also possible.

Figure 15A:
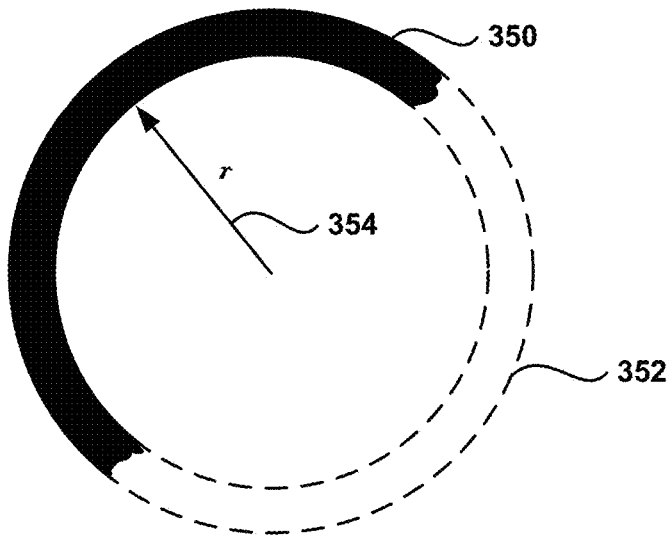
FIGS. 15A-B depict a method to estimate a complete ring area from a partial arc section.
Figure 15B:
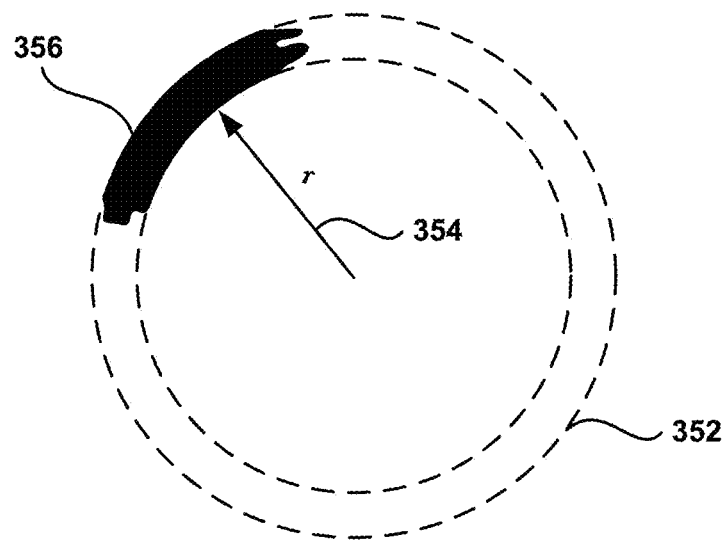

FIGS. 15A-B depicts a method to estimate a complete ring area from a partial arc section. FIG. 15A shows a captured ring 350, where only about half of ring 352 has been detected, such as when the ball is occluded. In general, it is easier to find the center of an arc with partial information, than finding the center of a circle with partial information. As described hereinabove with respects to FIGS. 6A-6D, determining the center of a circle is not a straightforward task with less than perfect information. On the other hand, it is relatively easy to find the center of an arc with information about half the arc, as in FIG. 15A.

By analyzing the curve corresponding to the ring, radius 354 can be estimated together with the center of the arc. FIG. 15B shows a scenario where a small section 356 of the ring has been captured. However, the same method used in FIG. 15A can be used to determine a circle with a high level of accuracy. Although less information is available, the analysis of the curve detected produces accurate results because only a small number of circles would fit this curve, and the variation between the circles is small, that is, the circles produce similar values of r and centers not far apart from each other.

In the case where the angle of the ring with respect to the camera can change, such as the ones corresponding to FIGS. 14A-D, the analysis is extended to cover ellipses. For example, given a perceived ring such as the half ellipse 252 of FIG. 14E, the method analyses the ellipse to estimate the long and the short axis of the ellipse, as well as the center of the ellipse.

Figure 16:
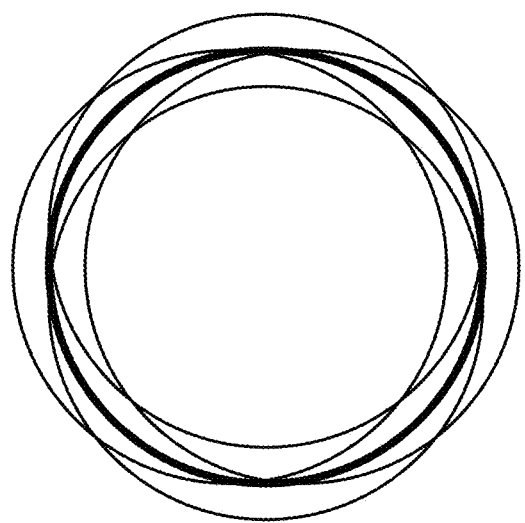
FIG. 16 shows and embodiment where the ball vibrates to increase the perceived ball surface.

FIG. 16 shows and embodiment where the ball vibrates to increase the perceived ball surface. As the ball vibrates, a longer perceived area is captured by the camera. This method can be combined with smoothing, such as the algorithm depicted in FIG. 9, to improve location determination. Because the ball vibrates from respect to each center, the comparison or averaging of consecutive images will help determine the true center with higher accuracy.

Figure 17B:
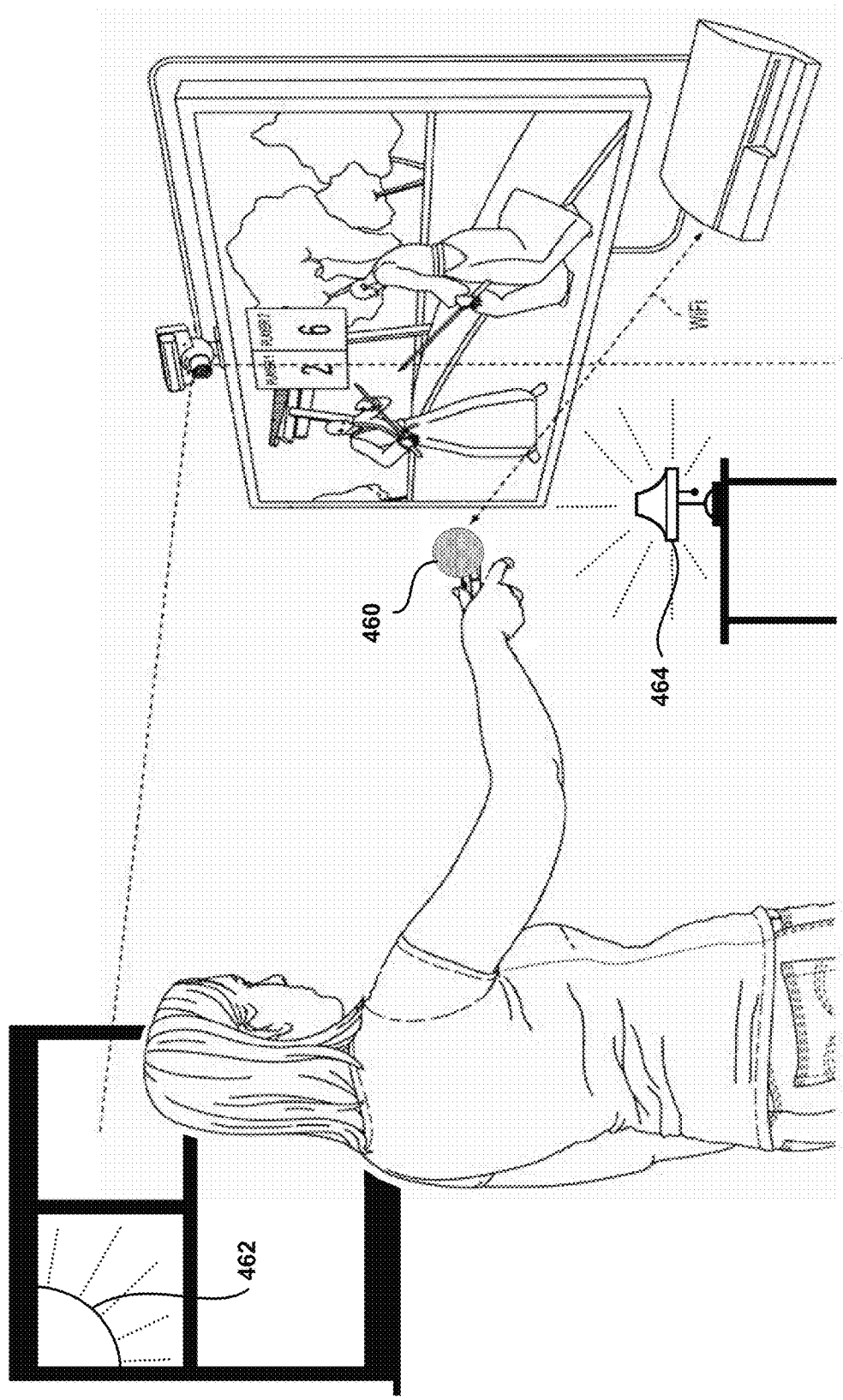

FIGS. 17A-B depict embodiments of a ball that can change size or appearance to improve detection. FIG. 17A depicts a ball that can change size. When player 450a is closer to camera 456 sitting atop display 458, ball 454a attached to controller 452 has a predetermined size. When the player is in location 450b, controller 452 and attached ball are farther away from the screen. As the ball gets relatively smaller in the image captured by the camera, determining the ball's location becomes harder. In order to improve detection, ball 454b is expanded to improve accuracy. The bigger ball translates into more pixels in the images captured, making determining the location of the controller more accurate. Several ways to inflate the ball are possible, such as inflation, a motor, etc.

In one embodiment, controller 452 is in communication with computing device 460 to convey the size of the ball. In another embodiment, computing device 460 sends commands to the controller to make the ball bigger as the number of pixels detected in the ball become lower than a predetermined threshold.

FIG. 17B shows controller with ball 460 that can change, modify or improve its appearance to improve detection depending on the lighting conditions in the field of play. If the field of play is nearby a source of light (natural or artificial), such as a window that can receive light from sun 462, then visual detection may be affected depending on the time of the day or night and the amount of light in the field of play. The appearance of the ball also is affected by the angle of impact from the sun rays. For example, the appearance of the ball will be different if the sunlight hits the ball at the front, back, or side. Similarly, lamp 464 (or the like) can affect visual detection depending on whether the lamp is on or off.

In one embodiment, ball 460 includes a light source inside that can be turned on or off to improve ball 460 visibility. The light source can be turned on by the player or by the computer system in communication with the controller including ball 460. In another embodiment, ball 460 can include a clear shell. In another embodiment, the shell can be frosted. Still further, the shell (either clear or frosted), can take on any shade, color or texture. For example, if the shell is frosted or has a shade, then the ball 460 can be made to appear darker when not illuminated. An example shade can be a gray, black, silver, or combinations of colors, so long as the color or shade provides good differentiating contrast, when placed in a particular environment. The shell can be made from many materials, such as plastics, rubber, glass, foam, molded materials, etc. And, these materials can take on any color, whether applied, dyed or molded.

Still further, the light source inside ball 460 can make ball 460 illuminated in different colors, such as white or yellow, while other colors are also possible. The illuminated ball can improve detection in low ambient light conditions, while a darker color ball improves detection in situations with bright light.

FIG. 18 shows an embodiment of game controller 470 with a ball section 472 enclosed in shell 478. Shell 478 lets light go thorough so the ball can be detected visually. In one embodiment, shell 478 lets light 474 come out in the direction from the ball towards the camera, but shell 478 does not let light 476 coming from the outside to go through. This way, there is less interference with the illuminated ball inside.

In another embodiment, shell 478 can selectively filter the light passing thorough, such as for example letting blue light go through in order to identify a blue ball.

Figure 19A:
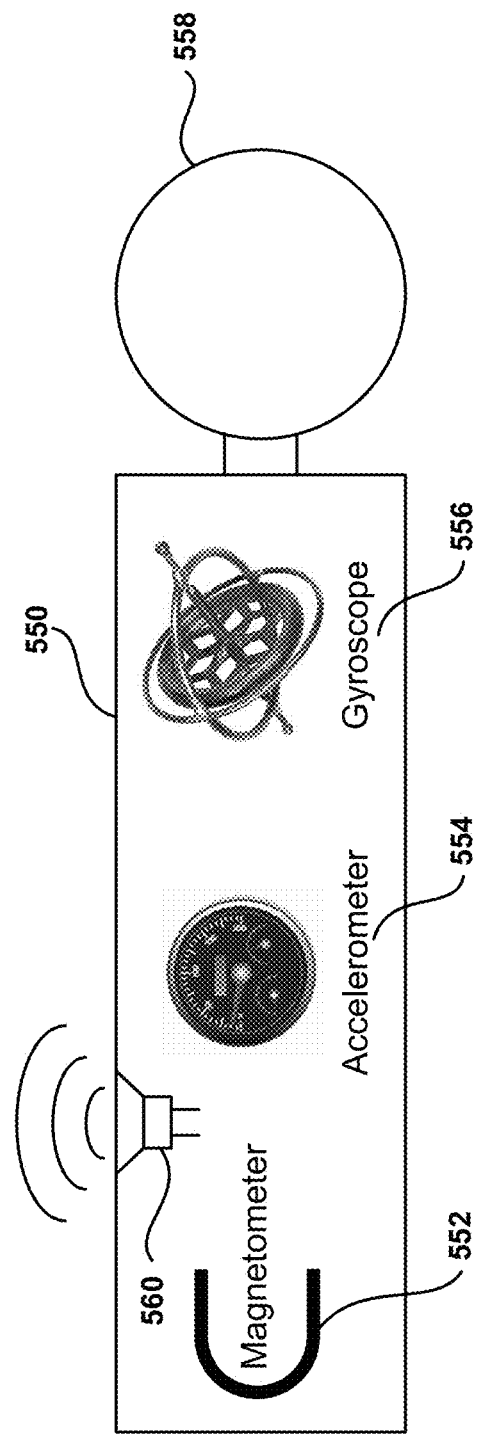

FIGS. 19A-B describe a controller with sensors for improving movement tracking, according to one embodiment. Different embodiments include different combinations of sensors, such as magnetometers, accelerometers, gyroscopes, etc.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers are used to provide the direction of gravity, which gives an absolute reference for 2 angles (world-space pitch and world-space roll). Controllers can suffer accelerations exceeding 5 g, therefore accelerometers able to operate with forces exceeding 5 g are used inside controller 550.

A magnetometer measures the strength and direction of the magnetic field in the vicinity of the controller. In one embodiment, three magnetometers 552 are used within the controller, ensuring an absolute reference for the world-space yaw angle. The magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from the gyros (see below) or the camera. In one embodiment, accelerometer 554 is used together with magnetometer 552 to obtain the inclination and azimuth of the controller.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires, resetting the gyroscopes periodically, which can be done using other available information, such as visual tracking of ball 558, accelerometer, magnetometer, etc. A hand-held device can rotate faster than 500 degrees/sec, so a gyroscopes with an spec of more than 1000 degrees/sec is recommended, but smaller values are also possible.

The information from the different sources can be combined for improved location and orientation detection. For example, if the ball disappears from view, the accelerometer's orientation sensing is used to detect that the controller is facing away from the camera. In one embodiment, controller 550 includes a speaker to provide audio feedback to the player. For example, the controller can produce a beep when the ball is not visible by the camera, prompting the player to orientate the controller in the right direction, or to come back into the field of play.

In the embodiment shown in FIG. 19B, the visual and sensor-originated information from several frames is analyzed to determine the location of the controller as well as the controller's orientation. By analyzing the information from several frames, the sensor information related to movement and orientation of the controller is "smoothed" over several frames. Once the trajectory of the ball is determined over several frames, the sensor information is analyzed to find the corresponding orientation of the controller that produces the given trajectory given the corresponding sensor information for those frames.

Figure 20:
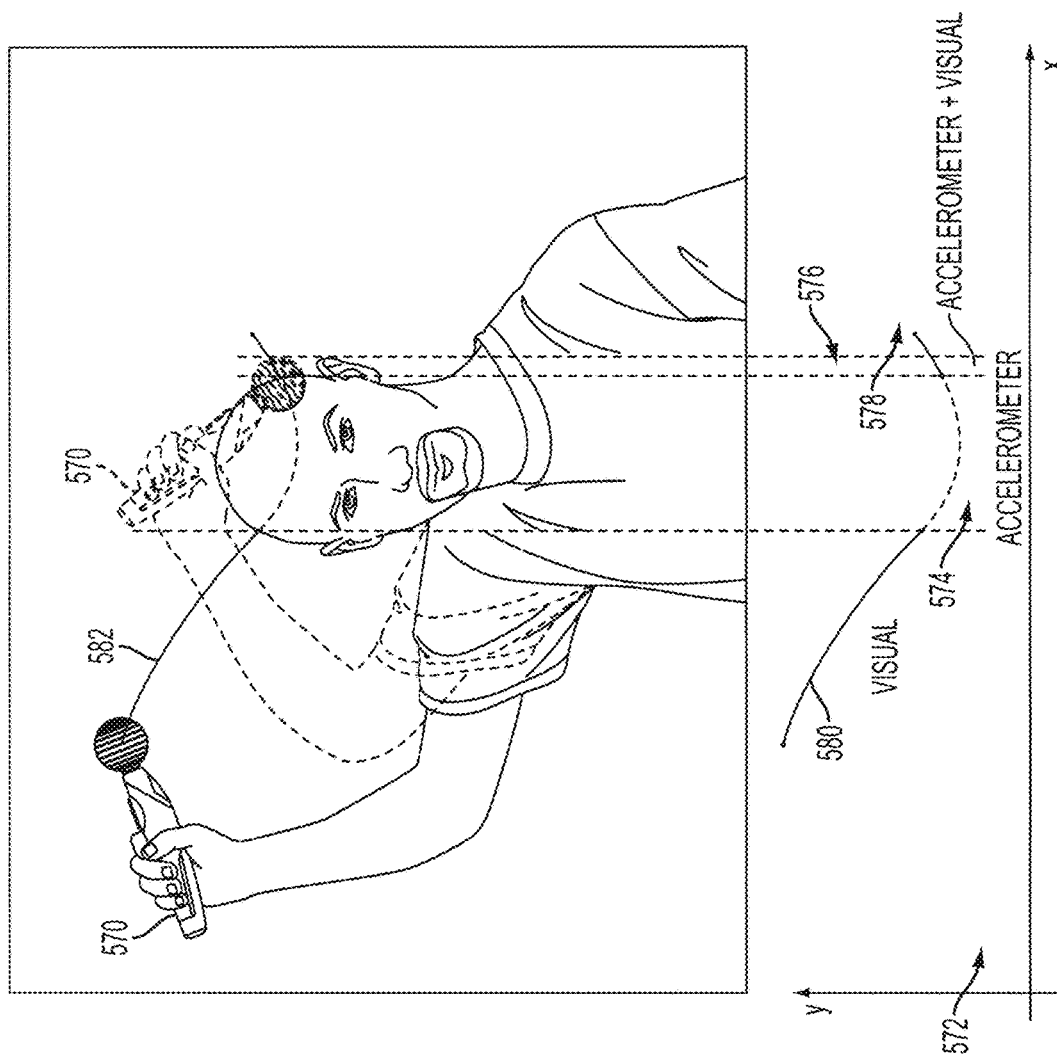
FIG. 20 depicts using different sources of information to assess controller position in accordance with one embodiment.

FIG. 20 depicts using different sources of information to assess controller position in accordance with one embodiment. Controller 570 includes a ball section attached, as well as accelerometers, as previously described with respect to FIG. 19. The computing system uses visual tracking of the ball in controller 570. When the ball gets occluded, such as when the controller follows trajectory 582 that causes occlusion when the ball is behind the player's head, the system uses dead reckoning. Dead reckoning (DR) is the process of estimating a current position based upon a previously determined position, or fix, and advancing that position based upon known speed, elapsed time, and course.

As the controller's ball follows path 582, the computing system tracks the controller under curve 580. Once the ball gets occluded, the accelerometers are reset and the system begins using dead reckoning. It should be noted, that dead reckoning loses accuracy over time, thus complementing dead reckoning with other location information is desirable for accurate tracking. Data from the accelerometers is always being captured, but may not be always used by the system.

Dead reckoning is used while the ball is occluded (region 574). Once the ball is back on sight, visual tracking takes over in region 578. In one embodiment, dead reckoning can be combined at times with visual tracking, such as the region when the ball is coming out of invisibility and visual information is still not very accurate because of partial occlusion, or because of the lack of visual history to track the ball's movement.

Figure 21B:
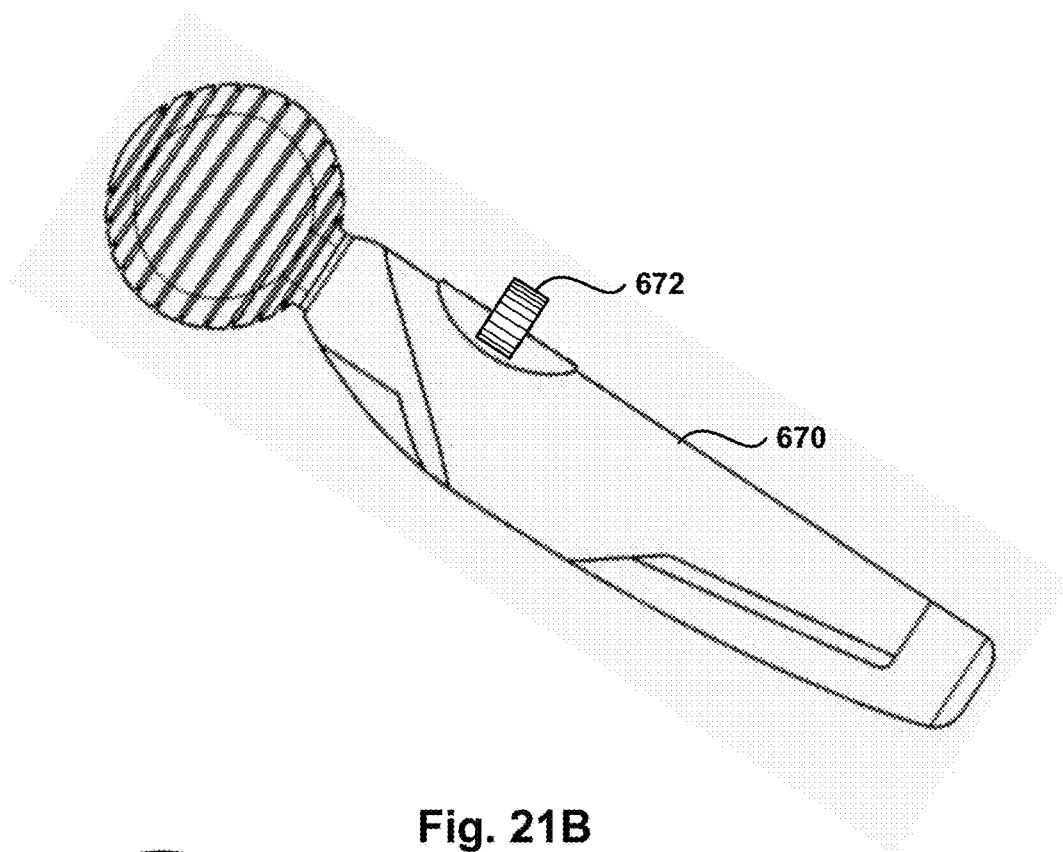
Figure 21C:
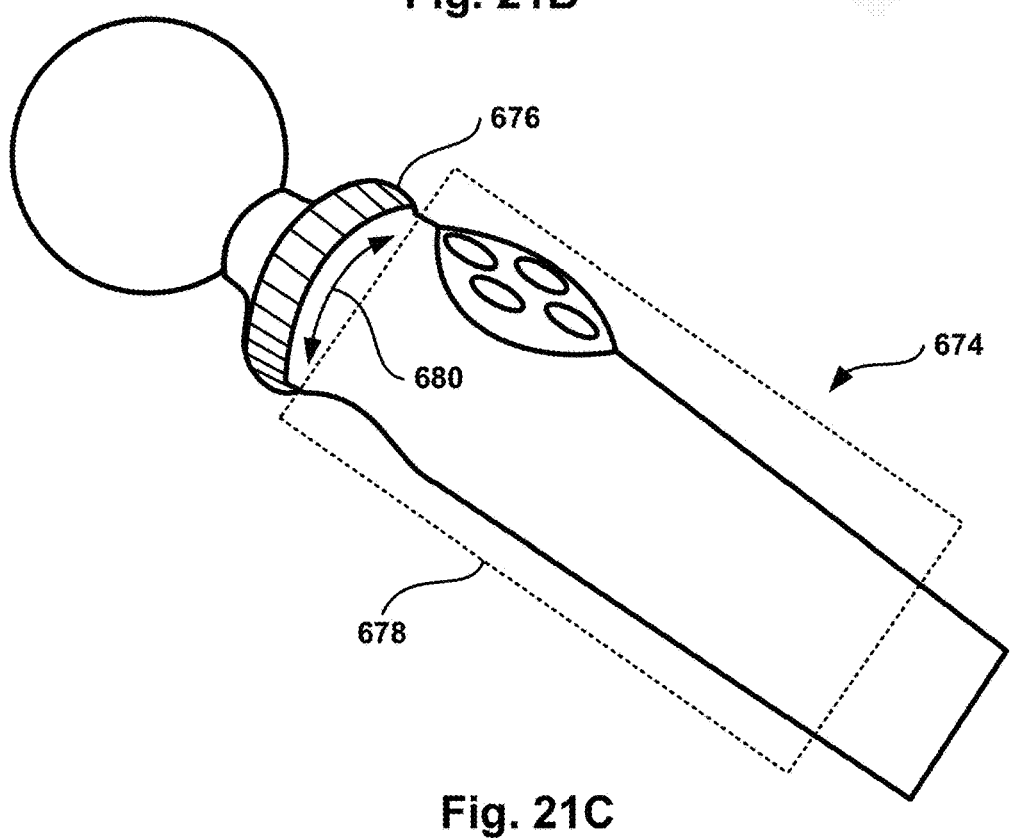

FIGS. 21A-C describe the use of an input wheel in the controller to initiate computer actions, according to one embodiment. Controller orientation is combined with wheel movement to generate actions in the computing system. For example, a player may place the controller in the x, y, or z direction and then rotate the wheel, causing an icon in the screen to move in that direction. In fact, the controller does not have to be orientated along an axis, and any orientation can cause a corresponding movement on the screen. For example, a controller placed at 45 degrees between the x and y axis, will cause an icon on display 654 to move in that direction. Additionally, the wheel can be used to navigate menus. For example, to move vertically or horizontally across menus, according to the orientation of the controller. FIG. 21A shows controller 650 including wheel 658A in a vertical or longitudinal orientation. FIG. 21B shows controller 670 including wheel 672 in a horizontal or latitudinal orientation. The top part of wheel 672 is used by the player to input commands. FIG. 21C shows controller 674 that also includes wheel 676 in a horizontal or latitudinal orientation. Wheel 676 wraps around the controller and moves perpendicularly 680 relative to the holding portion 678 of the body of the controller. The complete circumference of wheel 676 is available to the user which can operate the wheel from the top, the sides, the bottom, or any other angle, and with the possibility of operating the wheel using different fingers.

Figure 22:
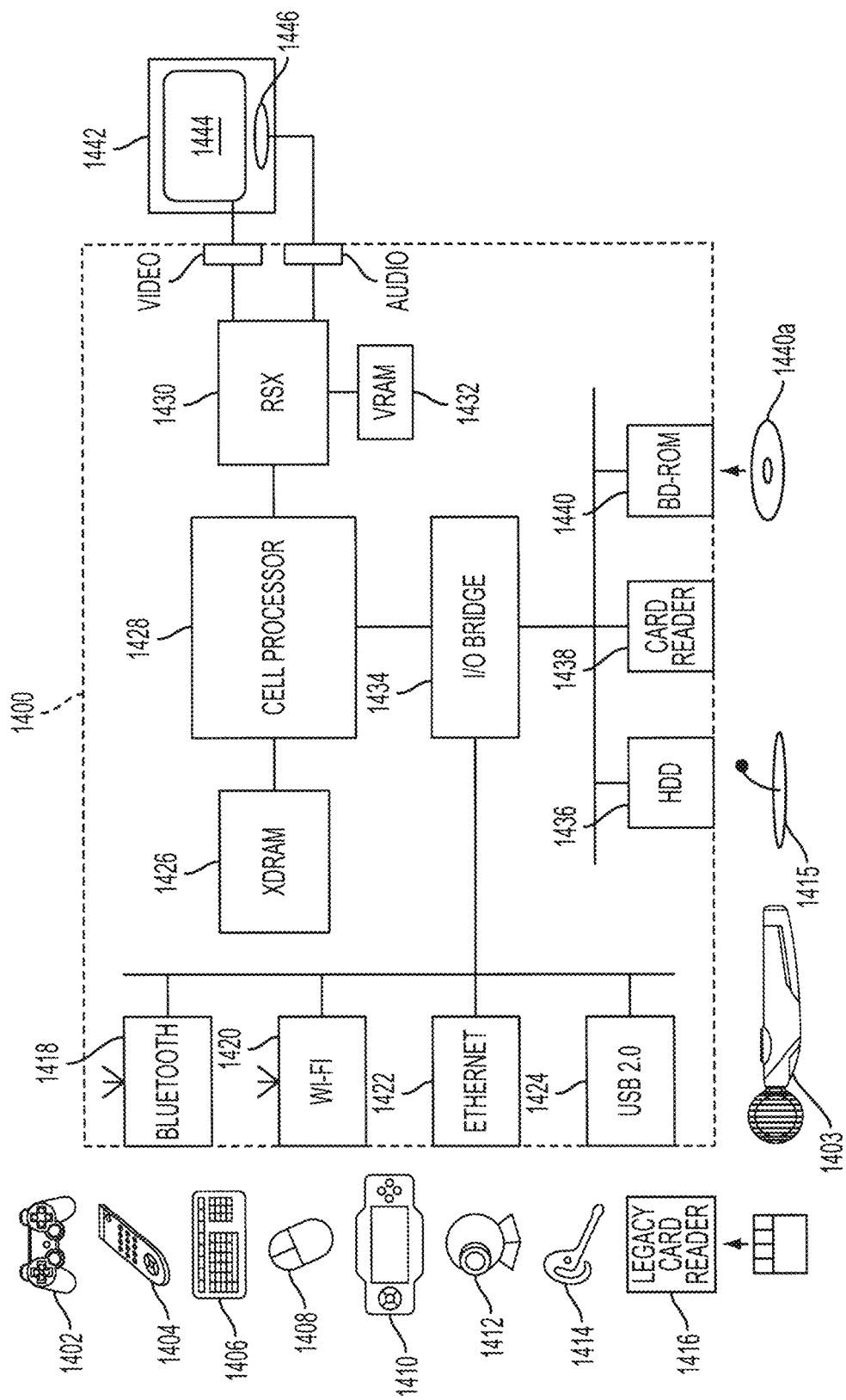
FIG. 22 illustrates hardware and user interfaces that may be used to determine controller location, in accordance with one embodiment of the present invention.

FIG. 22 illustrates hardware and user interfaces that may be used to determine controller location, in accordance with one embodiment of the present invention. FIG. 22 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands, and game controller 1403 is a single-hand controller with a ball attachment, as previously described in FIGS. 1A-4A. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 23:
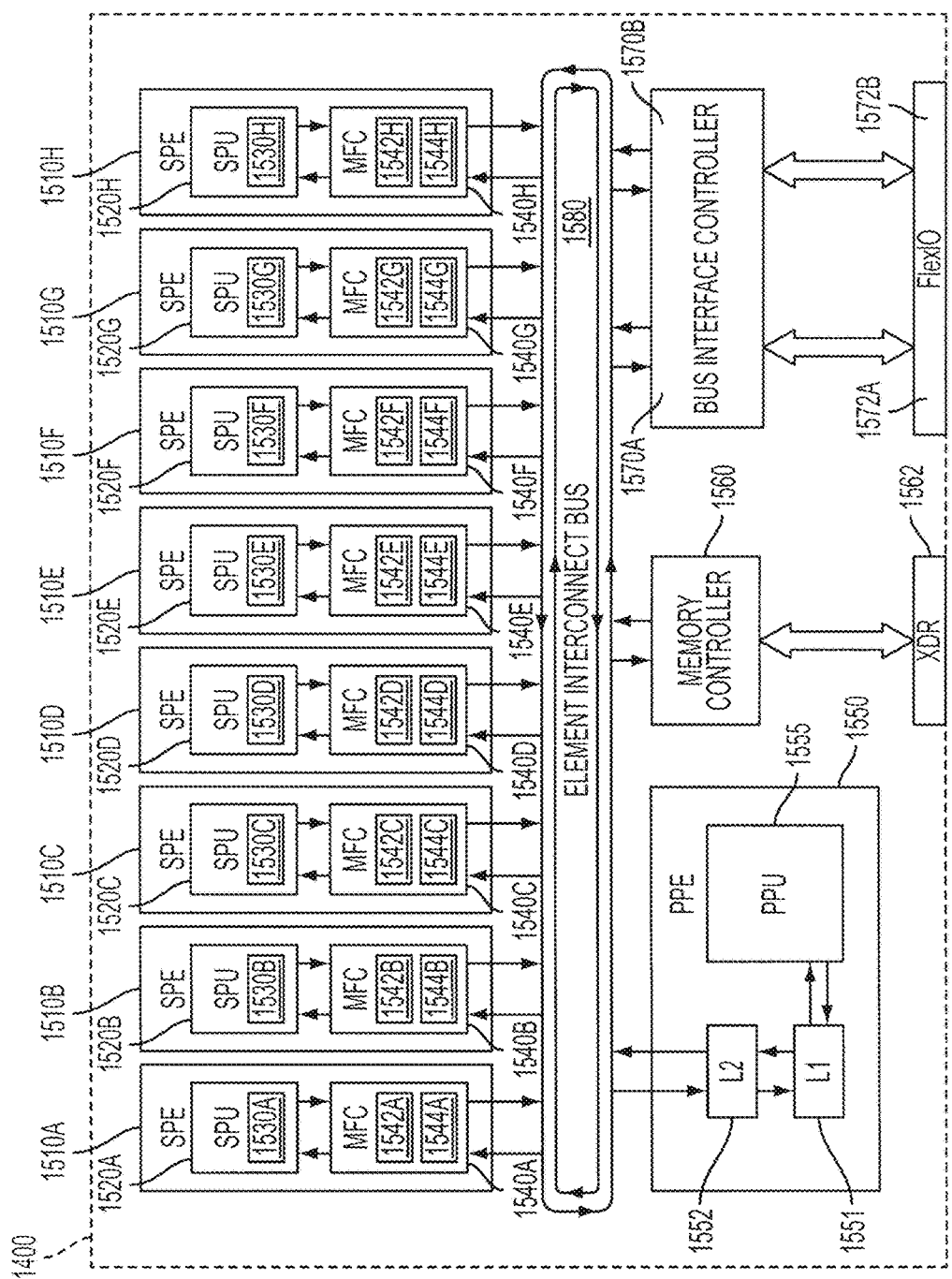
FIG. 23 illustrates additional hardware that may be used to process instructions, in accordance with one embodiment of the present invention.

FIG. 23 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 24:
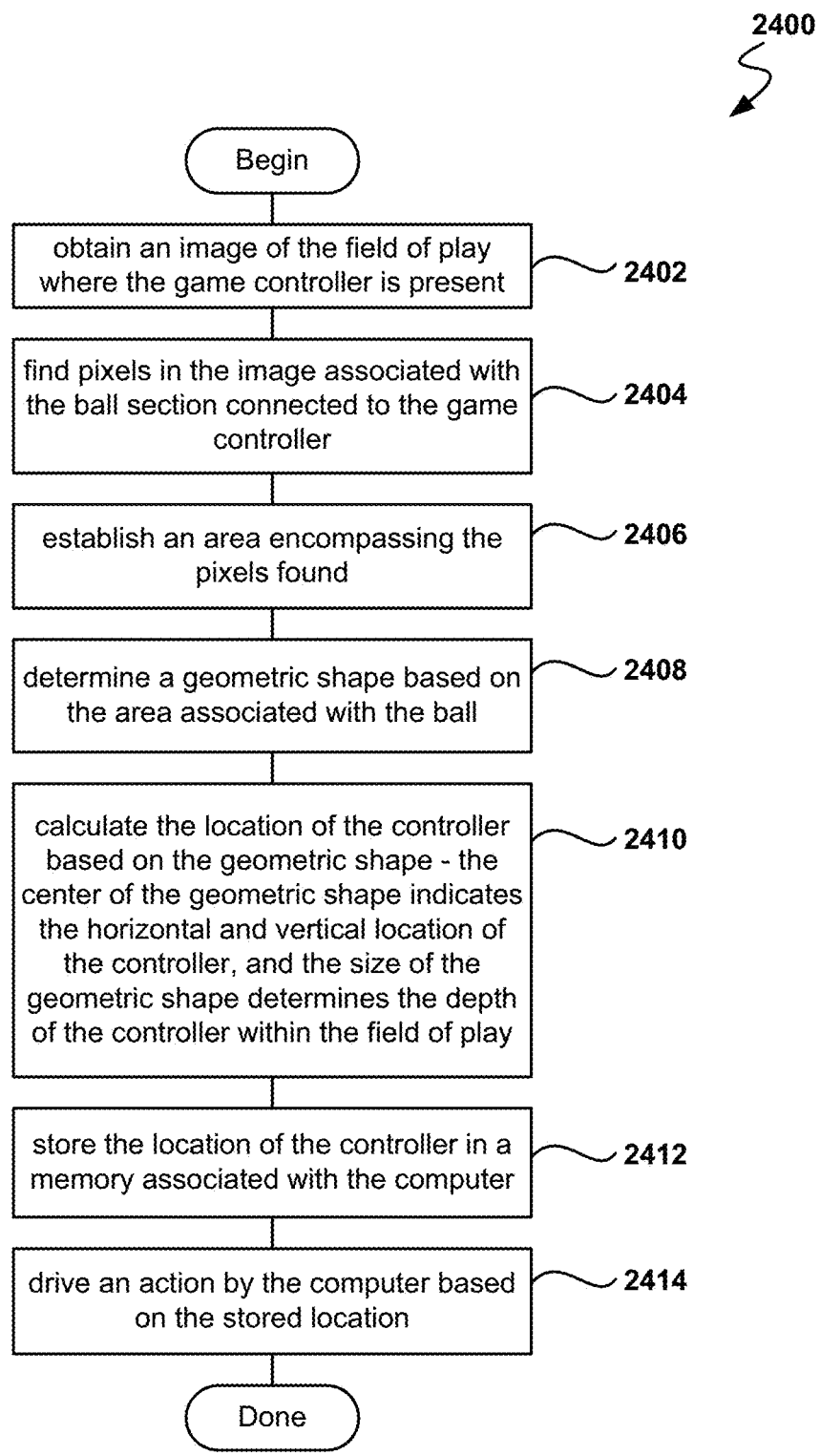
FIG. 24 shows a flow chart describing an embodiment for a method to determine a location in a field of play of a ball-attached game controller.

FIG. 24 shows flow chart 2400 describing an embodiment for a method to determine a location in a field of play of a ball-attached game controller. In operation 2402, the method obtains an image of the field of play where the game controller is present, and then finds pixels in the image associated with the ball connected to the game controller. In one embodiment, the image is scanned to find pixels that correspond to the color of the ball, and in another embodiment, subpixels analysis is used to find pixels associated with the ball, as previously described with respect to FIG. 7.

In operation 2406, the method establishes an area encompassing the pixels that were found. A geometric shape is determined in operation 2408 based on the area associated with the ball. See FIGS. 6A-6D, 9, and 12 for different embodiments of methods to perform area recognition. Once the geometric shape is determined, the method, in operation 2410, calculates the location of the controller based on the geometric shape, where the center of the geometric shape indicates the horizontal and vertical location of the controller, and the size of the geometric shape determines the depth of the controller within the field of play. The calculated location is stored in a memory associated with the computer in operation 2412, and the computer drives an action based on the stored location in operation 2414.

Figure 25:
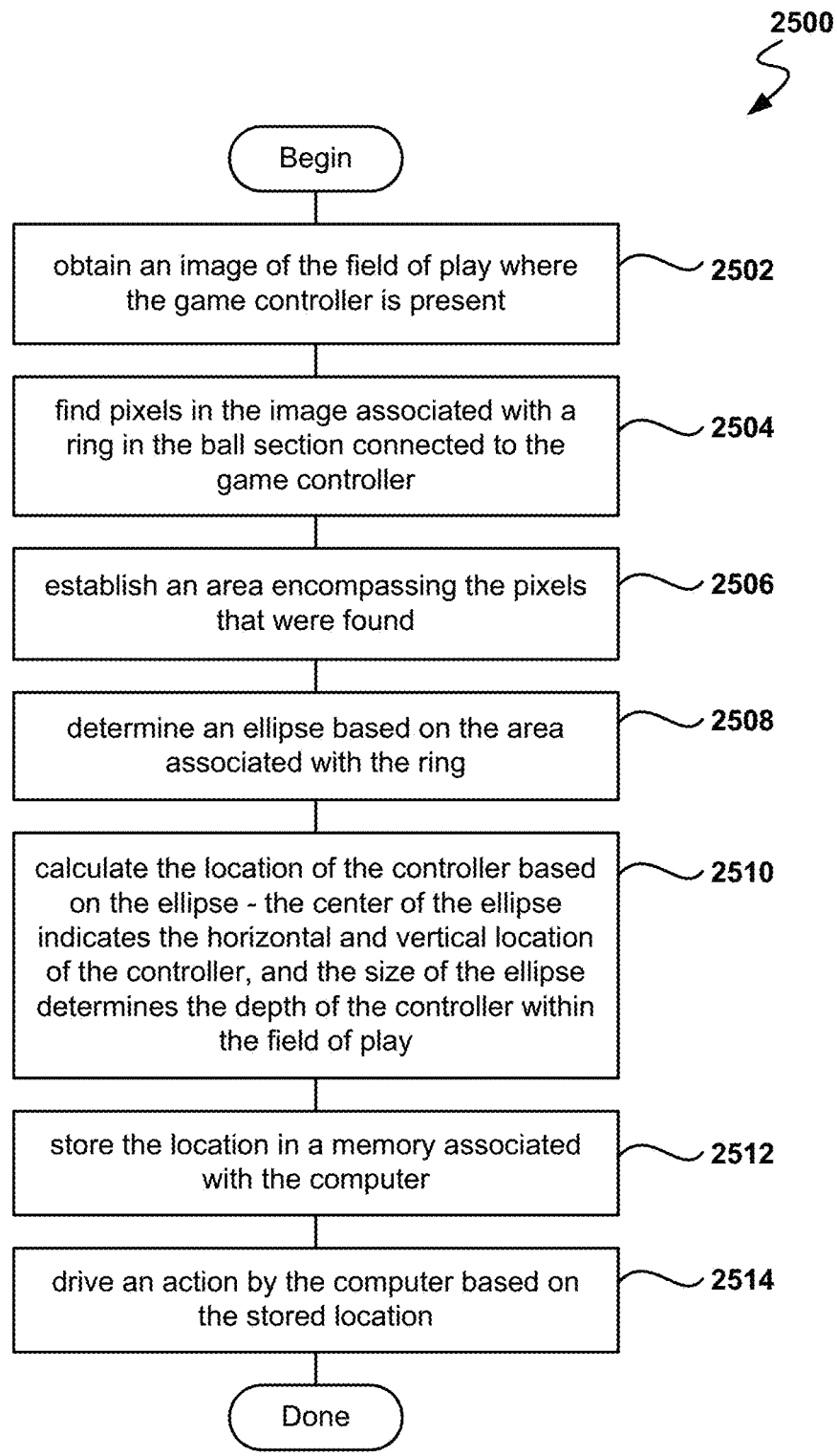
FIG. 25 includes a flow chart for a method to determine a location in a field of play of a ball with a distinguishable ring, according to one embodiment.

FIG. 25 includes a flow chart for a method to determine a location in a field of play of a ball with a distinguishable ring, according to one embodiment. This method is similar to the method previously described with respect to FIG. 24, but the method of FIG. 25 adds new considerations regarding the changes in shape of the ring as the controller moves within the three-dimensional space.

In operation 2502, the method obtains an image of the field of play where the game controller is present, as seen in FIG. 5. The image is scanned in operation 2504 to find pixels associated with a ring in the ball section connected to the game controller. See FIGS. 13A-15B for different embodiments related to location determination based on the ring in the ball attached to the controller.

In operation 2506, the method establishes an area encompassing the pixels found in operation 2504, and, in operation 2508, the method determines an ellipse based on the area associated with the ring. The location of the controller is calculated, in operation 2510, based on the ellipse. The center of the ellipse indicates the horizontal and vertical location of the controller, and the size of the ellipse determines the depth of the controller within the field of play. The location is stored, during operation 2212, in a memory associated with the computer. The computer drives an action in response to the location stored in operation 2514.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A video game controller for wireless interfacing with a computing system, the video game controller comprising:
    an elongated body in a form of a handle, the elongated body having a first end and a second end;
    an object disposed at the second end of the elongated body, the second end being opposite to the first end along a longest dimension of the elongated body, the object having a shape for visual recognition;
    a light source exposed in the object, wherein the object is defined to be illuminated when the light source is active;
    buttons disposed between the first end and the second end of the elongated body;
    an inertial sensor disposed within the elongated body; and
    one or more circuits disposed in the elongated body, the one or more circuits defined to be in communication with the light source, the buttons, the inertial sensor, and an antenna, the antenna provided for wireless communication to and from the computing system.

2. The video game controller as recited in claim 1, wherein the shape of the object is selected from a group consisting of a spherical section, a partial sphere, an imperfect sphere, an elongated ball, or a cube.

3. The video game controller as recited in claim 1, wherein the object is translucent.

4. The video game controller as recited in claim 1, wherein the object is plastic.

5. The video game controller as recited in claim 1, wherein the light source is a light-emitting diode (LED).

6. The video game controller as recited in claim 1, wherein the light source provides one or more of a plurality of colors or a white light.

7. The video game controller as recited in claim 1, wherein the one or more circuits are operable to set the light source as active or as inactive.

8. The video game controller as recited in claim 1, wherein one of the buttons is a trigger button defined to be operable by an index finger of a hand holding the controller by the handle.

9. The video game controller as recited in claim 1, wherein the handle further includes a universal serial bus (USB) port in communication with the one or more circuits.

10. The video game controller as recited in claim 1, wherein the wireless communication includes at least one or more of Bluetooth, wireless network (WiFi), or ultrasound.

11. The video game controller as recited in claim 1, wherein the one or more circuits include a processor.

12. The video game controller as recited in claim 1, wherein the one or more circuits include a memory.

13. The video game controller as recited in claim 1, wherein the inertial sensor is defined by one or more of an accelerometer, a magnetometer, or a gyroscope in communication with the one or more circuits.

14. A video game controller for wireless interfacing with a computing system, the video game controller comprising:
an elongated body in a form of a handle, the elongated body having a first end and a second end;
an object disposed at the second end of the elongated body, the second end being opposite to the first end along a longest dimension of the elongated body, the object being defined from a translucent material;
a light source exposed in the object;
buttons disposed between the first end and the second end of the elongated body;
an inertial sensor disposed within the elongated body; and
one or more circuits disposed in the elongated body, the one or more circuits defined to be in communication with the light source, the inertial sensor, the buttons, and an antenna, the antenna provided for wireless communication.

15. The video game controller as recited in claim 14, wherein a shape of the object is defined for visual recognition and is selected from a group consisting of a spherical section, a partial sphere, an imperfect sphere, an elongated ball, or a cube.

16. The video game controller as recited in claim 14, wherein the object is defined to be illuminated when the light source is active.

17. The video game controller as recited in claim 14, wherein the light source is a light-emitting diode (LED).

18. The video game controller as recited in claim 14, wherein the light source provides one or more of a plurality of colors or a white light.

19. The video game controller as recited in claim 14, wherein the one or more circuits are operable to set the light source as active or inactive.

20. The video game controller as recited in claim 14, wherein one of the buttons is a trigger button defined to be operable by an index finger.

21. The video game controller as recited in claim 14, wherein the handle further includes a universal serial bus (USB) port in communication with the one or more circuits.

22. The video game controller as recited in claim 14, wherein the one or more circuits include a processor.

23. The video game controller as recited in claim 14, wherein the one or more circuits include a memory.

24. A video game controller for wireless interfacing with a computing system, the video game controller comprising:
an elongated body in a form of a handle, the elongated body having a first end and a second end;
an object disposed at the second end of the elongated body, the second end being opposite to the first end along a longest dimension of the elongated body, the object having a shape;
a light source exposed in the object, wherein the object is defined to be illuminated when the light source is active;
buttons disposed between the first end and the second end of the elongated body, wherein one of the buttons is a trigger button defined to be operable by an index finger;
a universal serial bus (USB) port on the second end;
a battery disposed within the elongated body; and
one or more circuits disposed in the elongated body, the one or more circuits defined to be in communication with the light source, the buttons, the USB port, the battery, and an antenna, the antenna provided for wireless communication.

25. The video game controller as recited in claim 24, wherein the shape of the object is selected from a group consisting of a spherical section, a partial sphere, an imperfect sphere, an elongated ball, or a cube.

26. The video game controller as recited in claim 25, wherein the wireless communication includes at least one or more of Bluetooth, wireless network (WiFi), or ultrasound.

27. The video game controller as recited in claim 24, wherein the object is defined from translucent plastic.

28. The video game controller as recited in claim 24, wherein the light source is a light-emitting diode (LED).

29. The video game controller as recited in claim 24, wherein the light source provides one or more of a plurality of colors or a white light.

30. The video game controller as recited in claim 24, wherein the one or more circuits are operable to set the light source as active or as inactive.

31. The video game controller as recited in claim 24, wherein the one or more circuits include a processor.

32. The video game controller as recited in claim 24, wherein the one or more circuits include a memory.

33. The video game controller as recited in claim 24, wherein the video game controller further includes an inertial sensor inside the handle.

34. A video game controller for wireless interfacing with a computing system, the video game controller comprising:
an elongated body in a form of a handle, the elongated body having a first end and a second end;
an object disposed at the second end of the elongated body, the second end being opposite to the first end along a longest dimension of the elongated body, the object having a shape of an imperfect sphere;
a light source exposed in the object, wherein the object is defined to be illuminated when the light source is active;
buttons disposed between the first end and the second end of the elongated body, wherein one of the buttons is a trigger button defined to be operable by an index finger of a hand holding the controller by the handle;
an inertial sensor disposed within the elongated body;
a battery disposed within the elongated body; and
one or more circuits disposed in the elongated body, the one or more circuits defined to be in communication with the light source, the buttons, the inertial sensor, the battery, and an antenna, the antenna provided for wireless communication to and from the computing system.

35. The video game controller as recited in claim 34, wherein the light source is a light-emitting diode (LED).

36. The video game controller as recited in claim 34, wherein the light source provides one or more of a plurality of colors or a white light.

37. The video game controller as recited in claim 34, wherein the handle further includes a universal serial bus (USB) port in communication with the one or more circuits.

38. A video game controller for wireless interfacing with a computing system, the video game controller comprising:
- an elongated body in a form of a handle, the elongated body having a first end and a second end;
- an object disposed at the second end of the elongated body, the second end being opposite to the first end along a longest dimension of the elongated body, the object being translucent, plastic, and having a shape for visual recognition;
- a light source exposed in the object, wherein the object is defined to be illuminated when the light source is active, wherein the light source is a light-emitting diode (LED), wherein the light source provides one or more of a plurality of colors or a white light;
- buttons disposed between the first end and the second end of the elongated body;
- an inertial sensor disposed within the elongated body; and
- one or more circuits disposed in the elongated body, the one or more circuits defined to be in communication with the light source, the buttons, the inertial sensor, and an antenna, the antenna provided for wireless communication to and from the computing system.

* * * * *